(12) United States Patent
Kawase et al.

(10) Patent No.: US 11,085,847 B2
(45) Date of Patent: Aug. 10, 2021

(54) PHYSICAL QUANTITY MEASURING DEVICE AND MANUFACTURING METHOD OF PHYSICAL QUANTITY MEASURING DEVICE

(71) Applicant: NAGANO KEIKI CO., LTD., Tokyo (JP)

(72) Inventors: Nobuaki Kawase, Tokyo (JP); Toshinori Suzuki, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 182 days.

(21) Appl. No.: 16/448,563

(22) Filed: Jun. 21, 2019

(65) Prior Publication Data

US 2019/0391031 A1   Dec. 26, 2019

(30) Foreign Application Priority Data

Jun. 26, 2018   (JP) .............................. JP2018-121236

(51) Int. Cl.
*G01L 19/14* (2006.01)
*G01L 9/00* (2006.01)

(52) U.S. Cl.
CPC .......... *G01L 19/147* (2013.01); *G01L 9/0041* (2013.01); *G01L 19/148* (2013.01)

(58) Field of Classification Search
CPC ......... G01L 9/00; G01L 9/0041; G01L 19/00; G01L 19/14; G01L 19/147; G01L 19/148
See application file for complete search history.

(56) References Cited

U.S. PATENT DOCUMENTS

2007/0113659 A1* 5/2007 Mueller ................ G01L 19/147
                                                      73/714
2013/0255391 A1   10/2013 Schlitzkus et al.
2014/0331776 A1   11/2014 Petrarca
(Continued)

FOREIGN PATENT DOCUMENTS

| EP | 3184982 A1 | 6/2017 |
| JP | 3044019 | 5/2000 |
| JP | 3131370 | 1/2001 |

(Continued)

OTHER PUBLICATIONS

European Search Report dated Dec. 17, 2019, 5 pages.
Japanese Office Action dated Feb. 9, 2021, 1 page.

*Primary Examiner* — Nguyen Q. Ha
(74) *Attorney, Agent, or Firm* — Rankin, Hill & Clark LLP

(57) ABSTRACT

A physical quantity measuring device includes a sensor module; a joint attached with the sensor module; a connector configured to be connected to a first or a second cylindrical case and the joint; a circuit substrate attached with an electronic circuit configured to receive a signal detected by the sensor module; and a holder holding the circuit substrate. The holder can be housed in the first cylindrical case in a first posture where a first end is engaged with a first connector and a second end is in contact with a first cover, or in a second cylindrical case in a second posture where the first end is engaged with a second cover and the second end is in contact with a second connector. The holder has an engaging projection engageable with a first engagement groove provided to the first connector and a second engagement groove provided to the second cover.

11 Claims, 16 Drawing Sheets

(56) References Cited

U.S. PATENT DOCUMENTS

2015/0276535 A1* 10/2015 Seki ................ G01L 19/148
                                                    73/756
2017/0331227 A1* 11/2017 Jang ................ H01R 12/58

FOREIGN PATENT DOCUMENTS

| | | |
|---|---|---|
| JP | 2008-151738 | 7/2008 |
| JP | 4652962 | 3/2011 |
| JP | 2013-205418 | 10/2013 |
| JP | 2013-257237 | 12/2013 |
| JP | 2014-235072 | 12/2014 |
| JP | 2015-184260 | 10/2015 |
| JP | 2017-525961 | 9/2017 |

* cited by examiner

FIG.15
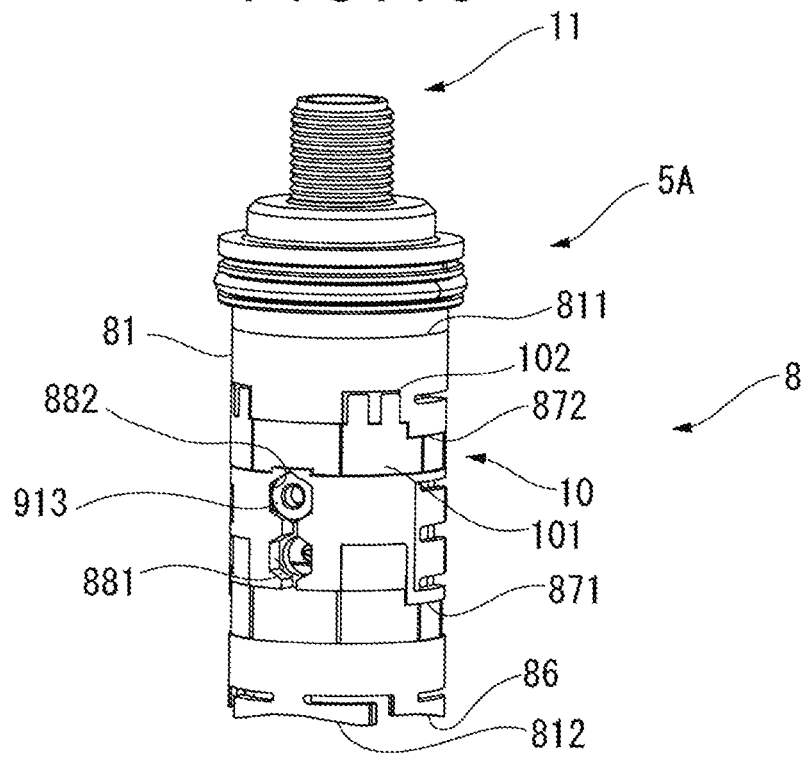
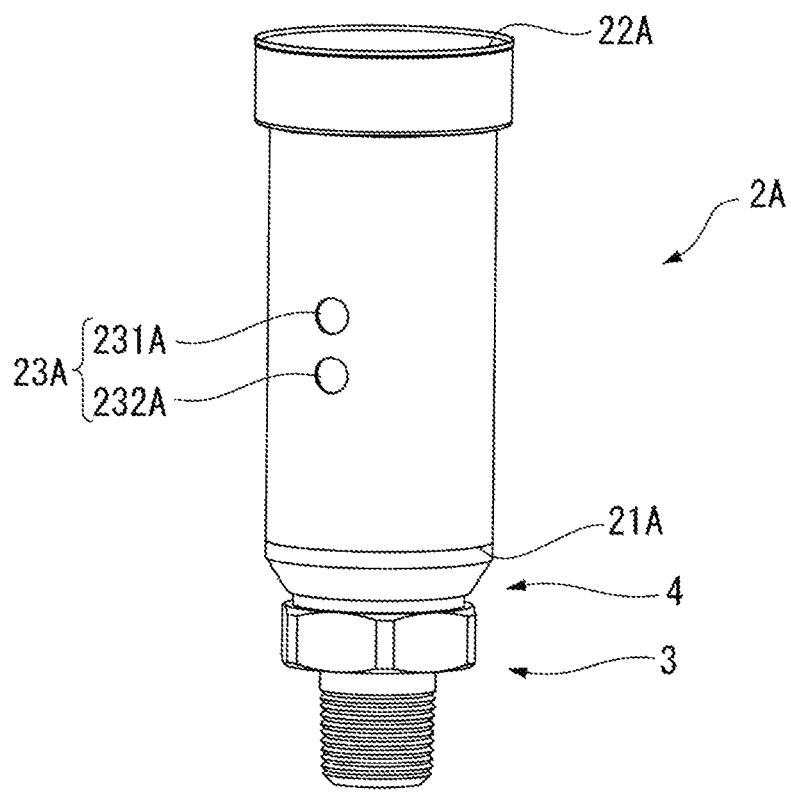

PHYSICAL QUANTITY MEASURING DEVICE AND MANUFACTURING METHOD OF PHYSICAL QUANTITY MEASURING DEVICE

The entire disclosure of Japanese Patent Application No. 2018-121236 filed Jun. 26, 2018 is expressly incorporated by reference herein.

TECHNICAL FIELD

The present invention relates to a physical quantity measuring device and a manufacturing method of the physical quantity measuring device.

BACKGROUND ART

A physical quantity measuring device installed with a circuit substrate has been known (Patent Literature 1: JP2014-235072 A). In the physical quantity measuring device of Patent Literature 1, the circuit substrate held by a support member is attached to a joint integrated with a sensor module. A cylindrical case is welded to the joint, whereby the circuit substrate is housed in the case.

The physical quantity measuring device is occasionally applied to a device used in a clean room for a semiconductor manufacturing device and the like. In such a case, if welded spatters remain on the physical quantity measuring device, the welded spatters may adversely affect the above device. Accordingly, in the physical quantity measuring device to be applied to the above device, a welded portion is occasionally subjected to ultrasonic cleaning in a manufacturing process. However, in the physical quantity measuring device of Patent Literature 1, since the case is welded to the joint after the circuit substrate is attached to the joint, the ultrasonic cleaning cannot be applied to the welded portion.

A physical quantity measuring device applicable to the device used in the clean room and the like has been known (Patent Literature 2: JP2015-184260 A). In the physical quantity measuring device of Patent Literature 2, the circuit substrate held by the support member is attached to a cover. Accordingly, after the joint is welded to the case and the welded portion is subjected to the ultrasonic cleaning, the cover attached with the circuit substrate can be connected to the case. By this operation, the physical quantity measuring device in which the welded portion has been subjected to the ultrasonic cleaning can be supplied.

Since the physical quantity measuring device of Patent Literature 1 and the physical quantity measuring device of Patent Literature 2 are thus different in the manufacturing process depending on the intended use, the support member having an individual structure is required.

Meanwhile, use of a common component in physical quantity measuring devices has been proposed. There have been known techniques for using a common component. For instance, side walls of a stem are provided at various thicknesses and a diaphragm can be selected depending on a magnitude of a pressure of a measurement target (Patent Literature 3: JP2008-151738 A). A holder can be selected depending on an attachment target surface and the rest are common components (Patent Literature 4: JP Patent No. 4652962). A chip and a pressure introduction pipe are exchangeable (Patent Literature 5: JP Patent No. 3131370). An interface module is exchangeable (Patent Literature 6: JP Patent No. 3044019).

However, Patent Literatures 3 to 6 do not disclose that the physical quantity measuring devices manufactured according to different processes have a common component, failing to achieve the common use of the component.

SUMMARY OF THE INVENTION

An object of the invention is to provide a physical quantity measuring device capable of achieving a common use of a component in different manufacturing processes, and a manufacturing method of the physical quantity measuring device.

According to an aspect of the invention, a physical quantity measuring device includes: a sensor module configured to detect a physical amount; a joint attached with the sensor module; an annular connector configured to be connected to a first open end of a first cylindrical case and the joint, and also to be connected to a first open end of a second cylindrical case and the joint; a circuit substrate attached with an electronic circuit configured to receive a signal detected by the sensor module; and a holder holding the circuit substrate, in which the holder having a first end and a second end is configured to be housed in the first cylindrical case in a first posture, the first end being engaged with the connector and the second end being in contact with a first cover placed to a second open end of the first cylindrical case when the holder is in the first posture, and the holder includes, at the first end, an engaging projection engaged with a first engagement groove provided to the connector when the holder is in the first posture, and in which the holder having the first end and the second end is configured to be housed in the second cylindrical case in a second posture, the second end being in contact with the connector and the first end being engaged with a second cover placed to a second open end of the second cylindrical case when the holder is in the second posture, and the holder includes, at the first end, the engaging projection engaged with a second engagement groove provided to the second cover when the holder is in the second posture.

In the above aspect of the invention, the holder holding the circuit substrate has the engaging projection at the first end, the engaging projection being engageable with the first engagement groove of the connector and the second engagement groove of the second cover. With this arrangement, the holder can be engaged with any one of the first connector and the second cover to be attached thereto. Accordingly, in the manufacturing process, the holder is applicable to both of a first physical quantity measuring device provided by welding the connector to the first cylindrical case after attaching the holder to the connector and a second physical quantity measuring device provided by attaching the second cover, which is attached with the holder, to the second cylindrical case after welding the connector, which is connected to the joint, to the second cylindrical case. Accordingly, a component serving as the support member can be used in common between the physical quantity measuring devices provided by different manufacturing processes.

In the physical quantity measuring device with the above arrangement, a distance between the electronic circuit and the sensor module when the holder is in the first posture is preferably the same as the distance when the holder is in the second posture.

Herein, the same distance means not only exactly the same distance but also a distance including an error and the like caused during the manufacturing process.

In the above arrangement, since the distance between the electronic circuit and the sensor module in the first posture is the same as that in the second posture, a cable or the like electrically connecting the electronic circuit and the sensor module is usable in common.

In the physical quantity measuring device with the above arrangement, preferably, the circuit substrate includes an electronic adjuster configured to adjust the electronic circuit, the electronic adjuster includes at least one operated portion that is disposed facing a circumferential surface of the cylindrical cases, the cylindrical cases include at least one operation hole at a position corresponding to the at least one operated portion on the circumferential surface, and the physical quantity measuring device further includes at least one cap member detachably attached over the at least one operation hole.

In the above arrangement, since the operation hole is provided on the circumferential surface of the cylindrical cases at the position corresponding to the operated portion of the electronic adjuster, a screwdriver or the like can be inserted from the operation hole on the circumferential surface of the cylindrical cases and be used for operating the operated portion. By this operation, since it is not necessary to remove the covers in order to operate the operated portion, the adjustment of the electronic circuit can be easily performed. Moreover, since the cap member is attached over the operation hole, water can be prevented from entering the cylindrical cases from the operation hole.

In the physical quantity measuring device with the above arrangement, preferably, the at least one operated portion includes a first operated portion for span adjustment and a second operated portion for zero adjustment, the at least one operation hole includes a first operation hole provided at a position corresponding to the first operated portion and a second operation hole provided at a position corresponding to the second operated portion, the at least one cap member includes a first cap member configured to close the first operation hole and a second cap member configured to close the second operation hole, the second cap member includes a second cap body configured to close the second operation hole and a second cap connector extending from the second cap body and having an insertion hole, and the first cap member includes a fastening portion configured to be inserted in the insertion hole and the first operation hole and to fasten the second cap member to the circumferential surface of the cylindrical cases.

In the above arrangement, the operated portion includes the first operated portion for span adjustment and the second operated portion for zero adjustment. The operation hole has the first operation hole at the position corresponding to the first operated portion and the second operation hole at the position corresponding to the second operated portion. Accordingly, the first operated portion or the second operated portion are operable with a screwdriver or the like being inserted into the first operation hole or the second operation hole, so that the span adjustment and the zero adjustment of the electronic circuit can be easily conducted.

Moreover, since the cap member includes the first cap member configured to close the first operation hole and the second cap member configured to close the second operation hole, water can be prevented from entering the cylindrical cases from the operation holes.

Further, the second cap member includes: the second cap body configured to close the second operation hole; and the second cap connector extending from the second cap body and having the insertion hole. The first cap member includes the fastening portion to be inserted into the insertion hole and the first operation hole and to fasten the second cap member to the circumferential surface of the cylindrical cases. In other words, the second cap body is fastened to the circumferential surface of the cylindrical cases through the second cap connector and the fastening portion of the first cap member. Accordingly, the second cap body can be prevented from being lost when the second cap body is removed from the second operation hole.

Since the span adjustment of the electronic circuit requires a skilled technique and an advanced knowledge, the span adjustment is carried out basically at a factory shipment and at maintenance by a skilled technical worker. At a daily maintenance, the zero adjustment is usually carried out as needed.

In the above arrangement, the first operation hole provided at the position corresponding to the first operated portion for the span adjustment is closed by the fastening portion that is difficult to remove. Accordingly, in a daily maintenance and the like, the first operated portion can be prevented from being unintentionally operated to conduct the span adjustment.

In the physical quantity measuring device with the above arrangement, preferably, the circuit substrate is rectangular in a plan view and a longitudinal direction of the circuit substrate is directed along center axes of the cylindrical cases, the holder includes a substantially cylindrical holder body including a cutout formed at a part of a circumference of the cylindrical holder body and extending in the longitudinal direction, and the holder body includes: an engagement portion configured to restrict a movement of the circuit substrate in the longitudinal direction; and a hook configured to restrict a movement of the circuit substrate in a direction intersecting the longitudinal direction.

In the above arrangement, since the holder body of the holder includes the engagement portion configured to restrict the movement of the circuit substrate in the longitudinal direction and the hook configured to restrict the movement of the circuit substrate in the direction intersecting the longitudinal direction, the holder body can securely hold the circuit substrate.

In the physical quantity measuring device with the above arrangement, the second cover is preferably attached to the second cylindrical case by crimping the second open end of the second cylindrical case.

In the above arrangement, since the second cover is attached to the second cylindrical case by crimping the second end of the second cylindrical case, it is not necessary to weld the second cover to the second cylindrical case. Accordingly, cleaning of the welded portion is not required after the second cover is attached to the second cylindrical case, so that the manufacturing process can be more freely designed.

In the physical quantity measuring device with the above arrangement, the holder preferably includes a beam elastically deformable in a direction along the center axes of the cylindrical cases and provided at a part of the second end of the holder, where the beam is capable of contacting with the connector and the covers.

In the above arrangement, the holder includes the beam elastically deformable in the direction along the center axes of the cylindrical cases and provided at a part of the second end of the holder, where the beam is capable of contacting with the connector or the first cover. Accordingly, the holder in any posture of the first posture and the second posture can be reliably brought into contact with the connector or the first cover when the holder is housed in the cylindrical cases. Consequently, the holder being housed in the cylindrical cases can be prevented from moving in the direction along the center axis of the cylindrical cases.

The physical quantity measuring device with the above arrangement preferably further includes: a signal transmitting member provided to the covers and configured to be electrically connected to the circuit substrate; and a shield member configured to electrically connect the circuit substrate to the cylindrical cases, in which the holder includes a shield-member attachment portion to which the shield member is attachable, the shield-member attachment portion includes: a first attachment portion close to the second end with respect to a center of the holder; and a second attachment portion close to the first end with respect to the center of the holder, and the shield member is attached to the first attachment portion when the holder in the first posture is housed in the first cylindrical case, and the shield member is attached to the second attachment portion when the holder in the second posture is housed in the second cylindrical case.

In the above arrangement, the physical quantity measuring device further includes the shield member configured to electrically connect the circuit substrate to the cylindrical cases. With this arrangement, since the circuit substrate can be grounded to the cylindrical cases, noise entering through the signal transmitting member can be prevented from affecting the electronic circuit.

Moreover, the shield-member attachment portion provided to the holder member includes: the first attachment portion close to the second end with respect to the center of the holder; and the second attachment portion close to the first end with respect to the center of the holder. The shield member is attached to the first attachment portion when the holder in the first posture is housed in the first cylindrical case. As described above, when the holder in the first posture is housed in the first cylindrical case, the second end of the holder is brought into contact with the first cover. Accordingly, the shield member attached to the first attachment portion is close to the first cover with respect to the center of the holder.

The shield member is attached to the second attachment portion when the holder in the second posture is housed in the second cylindrical case. As described above, when the holder in the second posture is housed in the second cylindrical case, the first end of the holder is engaged with the second cover. Accordingly, the shield member attached to the second attachment portion is close to the second cover with respect to the center of the holder.

As described above, the shield member is attached to a part of the holder close to the covers with respect to the center of the holder, irrespective of the first posture or the second posture of the holder to be housed in the cylindrical cases. Accordingly, since the distance between the shield member and the signal transmitting member provided to the covers can be shortened, the influence of noise entering the circuit substrate through the signal transmitting member can be reliably reduced.

In the physical quantity measuring device with the above arrangement, preferably, the shield member includes: a shield member body that is attached to the first attachment portion or the second attachment portion and is configured to be electrically connected to the circuit substrate; and a claw extending from the shield member body, a tip end of the claw being configured to be electrically connected to the cylindrical cases, and the shield member body is attached to the first attachment portion or the second attachment portion with the tip end of the claw facing the first end of the holder.

In the above arrangement, the shield member body is attached to the first attachment portion or the second attachment portion with the tip end of the claw facing the first end of the holder.

When the shield member body is attached to the first attachment portion, in other words, when the holder in the first posture is housed in the first cylindrical case, the first end of the holder is engaged with the connector. Accordingly, in the manufacturing process, the holder attached to the connector is housed into the first cylindrical case with the second end of the holder ahead. Since the tip end of the claw faces the first end, in other words, faces an opposite direction from a direction in which the holder is housed into the first cylindrical case, the claw is less likely to be caught with an inner surface of the first cylindrical case. Accordingly, in the manufacturing process, the claw can be prevented from being caught with the inner surface of the first cylindrical case to be damaged.

When the shield member body is attached to the second attachment portion, in other words, when the holder in the second posture is housed in the second cylindrical case, the first end of the holder is engaged with the second cover. Accordingly, in the manufacturing process, the holder attached to the second cover is housed into the second cylindrical case with the second end of the holder ahead. Accordingly, since the tip end of the claw faces the first end also in the second cylindrical case, the claw can be prevented from being caught with the inner surface of the second cylindrical case to be damaged.

As described above, the claw of the shield member can be prevented from being damaged when the holder in any posture of the first posture and the second posture is housed in the cylindrical cases.

According to another aspect of the invention, a manufacturing method of the physical quantity measuring device according to the above aspect of the invention includes: holding the circuit substrate with the holder; engaging the engaging projection of the holder with the first engagement groove of the connector connected to the joint; housing the holder in the first posture into the first cylindrical case from the first open end of the first cylindrical case; firstly welding the connector to the first open end of the first cylindrical case; and secondly welding the first cover to the second open end of the first cylindrical case.

In the above arrangement, the holder holding the circuit substrate is engaged with the connector connected to the joint before the holder is housed in the first cylindrical case. This operation facilitates wiring of a power line or the like electrically connecting the circuit substrate to the sensor module attached to the joint.

According to still another aspect of the invention, a manufacturing method of the physical quantity measuring device according to the above aspect of the invention includes: welding the connector connected to the joint to the first open end of the second cylindrical case; cleaning a welded portion between the second cylindrical case and the connector; holding the circuit substrate with the holder; engaging the engaging projection of the holder with the second engagement groove of the second cover; housing the holder in the second posture into the second cylindrical case from the second open end of the second cylindrical case and bringing the second end of the holder into contact with the connector; and crimping the second open end of the second cylindrical case to attach the second cover to the second cylindrical case.

In the above arrangement, the holder holding the circuit substrate is housed in the second cylindrical case after cleaning the welded portion between the second cylindrical case and the connector. Accordingly, the welded portion can be cleaned without affecting the circuit substrate.

BRIEF DESCRIPTION OF THE DRAWING(S)

FIG. 15 is a perspective view showing the holder being housed in the cylindrical case in the manufacturing process of the second physical quantity measuring device in the exemplary embodiment.

DESCRIPTION OF EMBODIMENT(S)

An exemplary embodiment of the invention will be described with reference to the attached drawings.

In the exemplary embodiment, two types of physical quantity measuring devices mutually different in a manufacturing process will be exemplarily described. A first physical quantity measuring device 1 of the exemplary embodiment, which is a device of measuring a pressure of a measurement target fluid, is applicable to typical industrial machines and construction machines. A second physical quantity measuring device 1A, which is a device of measuring a pressure of a measurement target fluid, is applicable to a device and the like used mainly in a clean room of a semiconductor manufacture apparatus and the like.

First Physical Quantity Measuring Device

Figure 1:
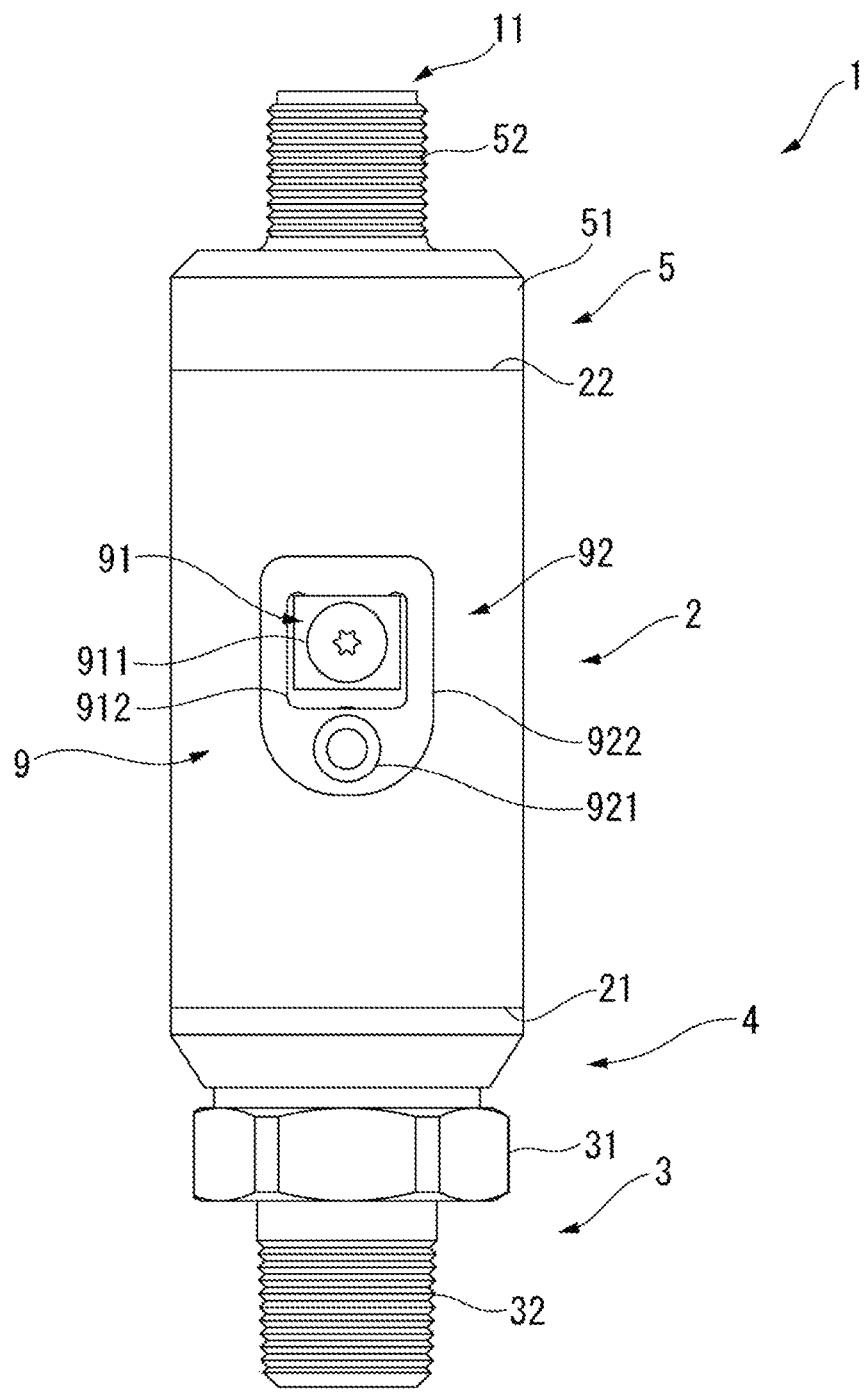
FIG. 1 is a front elevational view showing a first physical quantity measuring device according to an exemplary embodiment of the invention.
Figure 2:
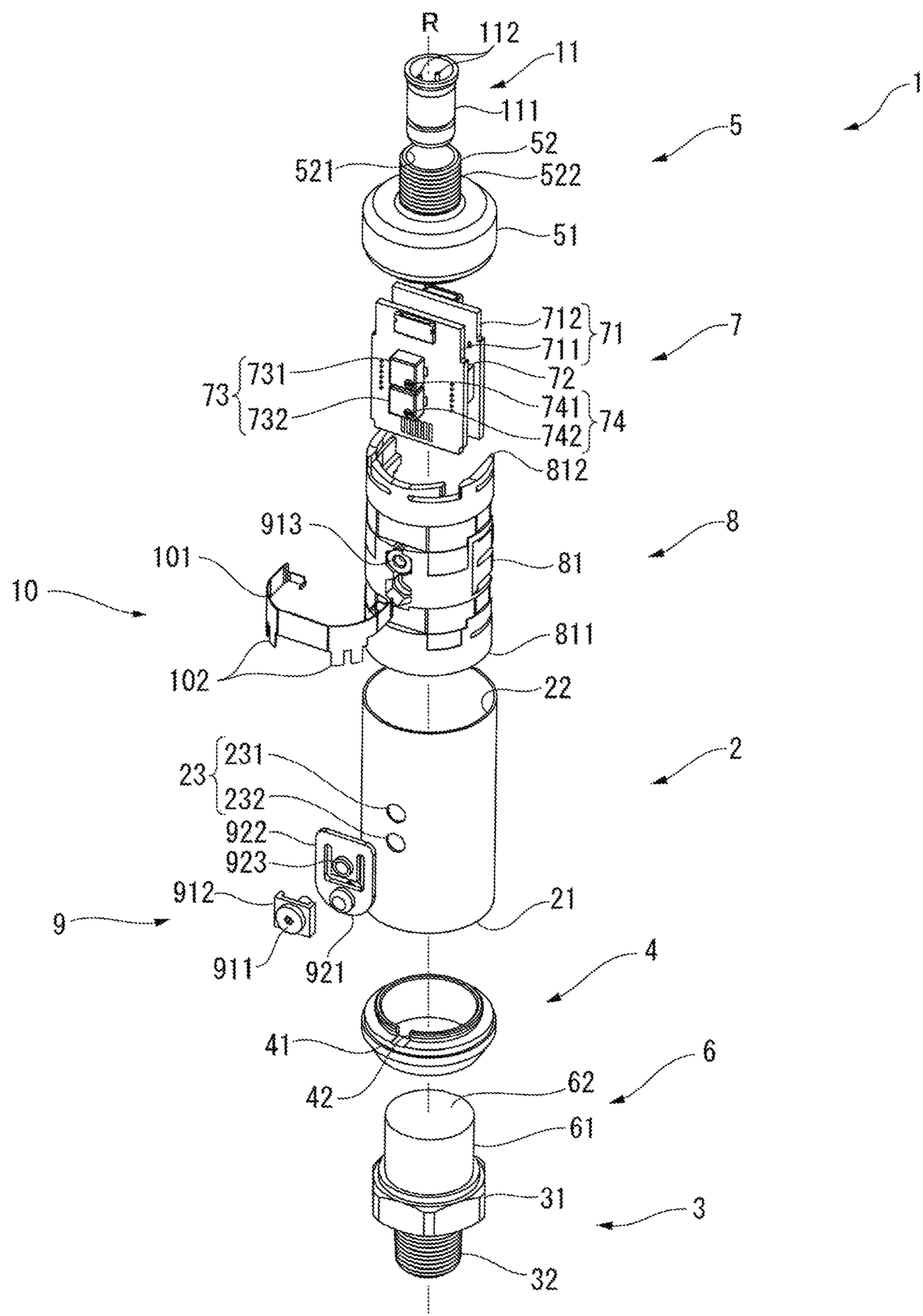
FIG. 2 is an exploded perspective view showing the first physical quantity measuring device according to the exemplary embodiment.

FIG. 1 shows a front elevational view of the first physical quantity measuring device 1. FIG. 2 shows an exploded perspective view of the first physical quantity measuring device 1.

As shown in FIGS. 1 and 2, the first physical quantity measuring device 1 includes a cylindrical case 2, a joint 3, a connector 4, a cover 5, a sensor module 6, a circuit substrate 7, a holder 8, a cap member 9, a shield member 10, and a signal transmitting member 11.

The cylindrical case 2, which is a metallic member in a form of a cylinder, has a first open end 21 and a second open end 22 that are formed opposite to each other in a direction along a center axis R. Moreover, the cylindrical case 2 has an operation hole 23, which includes a first operation hole 231 and a second operation hole 232, on the circumferential surface. The operation hole 23 is provided at a position corresponding to an electronic adjuster 73 of a circuit substrate 7, which will be described in detail later.

The joint 3, which is a metallic member, has an introduction hole (not shown) into which a measurement target fluid is introduced. A first end of the joint 3 is defined as an engagement portion 31 radially extending from the center of the joint 3 and being engageable with a tool (e.g., a spanner). A second end of the joint 3 is defined as a male thread 32 to be screwed into an attachment target (not shown).

The connector 4, which is a metallic member in a form of a ring, is welded to the first open end 21 of the cylindrical case 2 and the joint 3. Moreover, the connector 4 has a first engagement groove 41 and a first positioning recess 42 being respectively engageable with an engaging projection 82 and a positioning projection 83 of the holder 8 (described later). The first engagement groove 41 and the first positioning recess 42 will be described in detail later.

The cover 5, which is a metallic member in a so-called connector type, includes a cover body 51 and a cylindrical portion 52. An open end of the cover body 51 in a form of a bottomed cylinder is welded to the second open end 22 of the cylindrical case 2. The cover body 51 has, on the bottom, a communication hole (not shown) in communication with the cylindrical portion 52. An inner circumferential surface of the cylindrical portion 52 defines an attachment hole 521 in which the signal transmitting member 11 is housed. An outer circumferential surface of the cylindrical portion 52 defines a male thread 522.

The cover 5 is not limited to the members with the above arrangement, but may be, for instance, a terminal box type member in which a terminal block is provided, or a member capable of wireless output.

The sensor module 6 includes: a cylindrical portion 61 attached to the first end of the joint 3; and a diaphragm 62 integrated with a first end of the cylindrical portion 61. The diaphragm 62, in which a strain gauge (not shown) is formed, is configured to detect a pressure of the measurement target fluid being introduced from the introduction hole (not shown) with use of the strain gauge.

The sensor module 6 is not limited to one having the diaphragm, but may be, for instance, a so-called micro electro mechanical system (MEMS) sensor. Any sensor capable of detecting the pressure of the measurement target fluid is usable.

The circuit substrate 7 includes: a substrate body 71; and an electronic circuit unit 72 and an electronic adjuster 73 provided to the substrate body 71.

The substrate body 71, which is a rectangular plate in a plan view whose direction along the center axis R of the cylindrical case 2 is defined as a longitudinal direction, has a wiring pattern (not shown) on a front surface.

In the exemplary embodiment, the substrate body 71 includes a first substrate 711 and a second substrate 712 being disposed in parallel to each other and being connected to each other by a linking member (not shown).

The electronic circuit unit 72, which is configured to receive a detection signal from the sensor module 6, is provided on a side of the first substrate 711 facing the second substrate 712. The strain gauge of the sensor module 6 is electrically connected to the electronic circuit unit 72 with a wire (not shown).

The electronic adjuster 73, which is configured to adjust the electronic circuit unit 72, includes a first electronic adjuster 731 and a second electronic adjuster 732. The first electronic adjuster 731 and the second electronic adjuster 732 are provided to the first substrate 711 in a manner to face the circumferential surface of the cylindrical case 2. In the exemplary embodiment, the first electronic adjuster 731 shown on an upper side in FIG. 2 is used for a span adjustment of adjusting an output voltage and the second electronic adjuster 732 shown on a lower side in FIG. 2 is used for zero adjustment.

The electronic adjuster 73 also includes an operated portion 74 that serves as a trimmer. In the exemplary embodiment, a first operated portion 741 is provided to the first electronic adjuster 731 and a second operated portion 742 is provided to the second electronic adjuster 732. The above-described first operation hole 231 and second operation hole 232 are provided at positions corresponding to the respective first and second operated portions of the operated portion 74. With this arrangement, the first operated portion 741 or the second operated portion 742 is operable with a screwdriver or the like being inserted into the first operation hole 231 or the second operation hole 232, respectively. Accordingly, the span adjustment and the zero adjustment of the electronic circuit 72 can be easily conducted.

The cap member 9, which is detachably attached over the operation hole 23 of the cylindrical case 2, is configured to close the operation hole 23. The cap member 9 includes a first cap member 91 and a second cap member 92.

The first cap member 91, which is a metallic member, includes a fastening portion 911, a washer 912 and a nut 913. The fastening portion 911, which is a so-called male thread, is screwed into the nut 913 to close the first operation hole 231. The washer 912, which is a substantially rectangular member in a plan view, is disposed between a screw head of the fastening portion 911 and a later-described second cap connector 922. The nut 913, which is a so-called hexagon nut, is attached to a first nut attachment portion 881 of the holder 8 described later.

The second cap member 92, which is a rubber member, includes a second cap body 921 and a second cap connector 922. The second cap body 921 projects from the second cap connector 922 and closes the second operation hole 232. The second cap connector 922, which is a flat plate extending from the second cap body 921, has an insertion hole 923 at a position corresponding to the first operation hole 231. The fastening portion 911 of the first cap member 91 is inserted in the insertion hole 923. With this arrangement, the second cap body 921 is fastened to the circumferential surface of the cylindrical case 2 through the second cap connector 922 and the fastening portion 911.

The second cap member 92 is not limited to the rubber member, and any material such as a silicon member is usable.

The signal transmitting member 11 includes a cylindrical member 111 and a plurality of terminals 112 provided to the cylindrical member 111. The terminals 112 are electrically connected to the circuit substrate 7 through a power line or the like (not shown).

Holder

Figure 3:
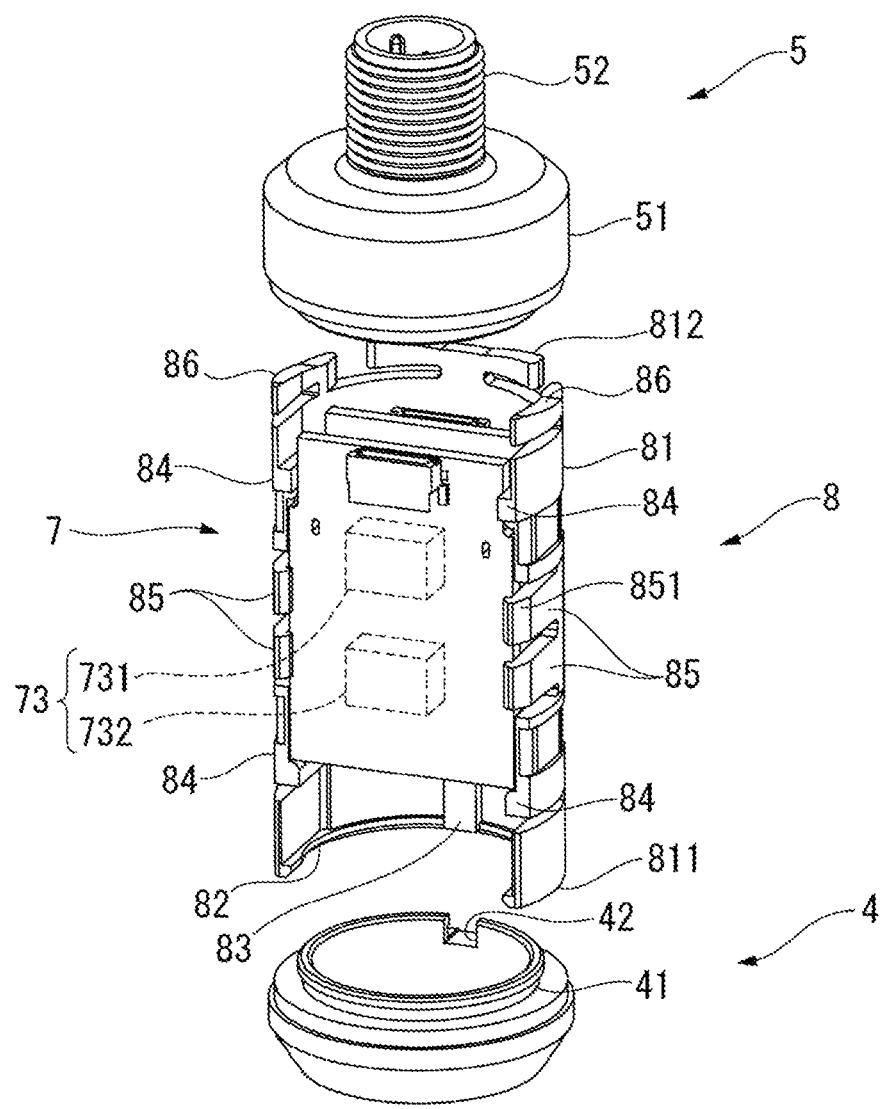
FIG. 3 is a perspective view showing a holder, a connector and a cover in the exemplary embodiment.

FIG. 3 is a perspective view showing the holder 8, the connector 4 and the cover 5.

As shown in FIG. 3, the holder 8 includes a substantially cylindrical holder body 81 having a cutout formed at a part of the circumferential surface thereof, the cutout extending in the longitudinal direction. A first end of the holder body 81 in the longitudinal direction is defined as a first end 811. A second end of the holder body 81 opposing the first end 811 is defined as a second end 812.

In the exemplary embodiment, the first end 811 is disposed close to the connector 4 and the second end 812 is disposed close to the cover 5. Such a posture of the holder 8 is defined as a first posture. In other words, the holder 8 in the first posture can be housed in the cylindrical case 2 of the first physical quantity measuring device 1.

The holder body 81 includes an engaging projection 82 on a side close to the first end 811, the engaging projection 82 being engageable with the first engagement groove 41 of the connector 4 described above. The holder body 81 is attached to the connector 4 by the engaging projection 82 being engaged with the first engagement groove 41.

Moreover, the holder body 81 includes a positioning projection 83 at a position corresponding to the first positioning recess 42 of the connector 4. The positioning projection 83 is engaged with the first positioning recess 42 when the engaging projection 82 is engaged with the first engagement groove 41. By this operation, the holder 8 is positioned relative to the connector 4.

Furthermore, the holder body 81 includes an engagement portion 84, a hook 85, and a beam 86.

The engagement portion 84 is provided by four engagement portions in total, specifically in which two engagement portions are provided close to the first end 811 across the cutout and the remaining two engagement portions are provided close to the second end 812 across the cutout. The four engagement portions 84 hold the circuit substrate 7 in the longitudinal direction. With this arrangement, the movement of the circuit substrate 7 in the longitudinal direction is restricted.

The hook 85 is provided by four hooks in a middle portion of the holder body 81, in which two hooks are provided on each side of the holder body 81 across the cutout. Claws 851 are provided to tip ends of the respective hooks 85 and hold the circuit substrate 7 in a transversal direction, in other words in a direction intersecting the longitudinal direction of the circuit substrate 7. With this arrangement, the movement of the circuit substrate 7 in the transversal direction is restricted.

The beam 86 is provided on a side of the holder body 81 close to the second end 812 and can be brought into contact with the cover 5 in the first physical quantity measuring device 1. Moreover, the beam 86 is elastically deformable in a direction along the center axis R of the cylindrical case 2. Accordingly, the holder 8 housed in the cylindrical case 2 is in contact with the cover 5 while the beam 86 is elastically deformed. Consequently, the beam 86 and the cover 5 can be in a tight contact with each other.

Figure 4:
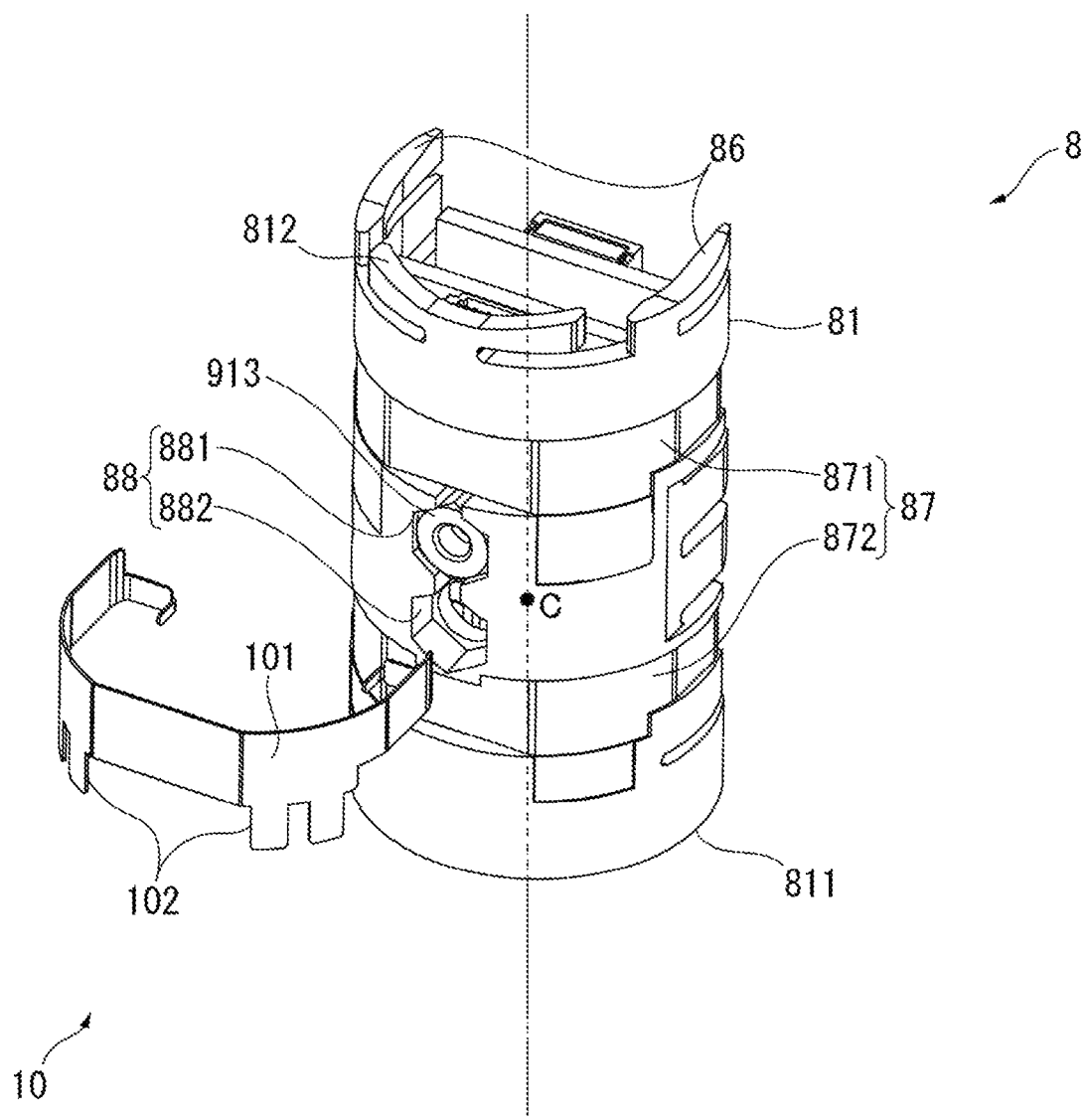
FIG. 4 is a perspective view showing the holder and a shield member viewed in a direction different from that in FIG. 3 in the exemplary embodiment.

FIG. 4 is a perspective view showing the holder 8 and the shield member 10 viewed in a direction different from that in FIG. 3.

As shown in FIG. 4, the holder body 81 includes a shield-member attachment portion 87 to which the shield member 10 is attachable.

The shield-member attachment portion 87 includes: a first attachment portion 871 close to the second end 812 and a second attachment portion 872 close to the first end 811, with respect to a center C of the holder 8 in the longitudinal direction. In the first physical quantity measuring device 1, the shield member 10 is attached to the first attachment portion 871. Accordingly, the shield member 10 is provided close to the second end 812, in other words, close to the cover 5.

The holder body 81 also includes a nut attachment portion 88 to which the nut 913 is attachable.

The nut attachment portion 88 includes: the first nut attachment portion 881 provided at an upper side in FIG. 4; and a second nut attachment portion 882 provided at a lower side in FIG. 4. The first nut attachment portion 881 and the second nut attachment portion 882 are respectively provided corresponding to the first electronic adjuster 731 and the second electronic adjuster 732 and penetrate the holder body 81. Accordingly, when a screwdriver or the like is inserted into the first operation hole 231 or the second operation hole 232, the screwdriver or the like can pass through the first nut attachment portion 881 or the second nut attachment portion 882, so that the first operated portion 741 or the second operated portion 742 are operable.

In the first physical quantity measuring device 1, the nut 913 is attached to the first nut attachment portion 881 as described above.

Shield Member

As shown in FIG. 4, the shield member 10, which is a metallic member, includes a shield member body 101 and a claw 102.

The shield member body 101 is attached to the shield-member attachment portion 87 to be electrically connected to the circuit substrate 7. In the first physical quantity measuring device 1, the shield member body 101 is attached to the first attachment portion 871.

The claw 102 extends from the shield member body 101. In the first physical quantity measuring device 1, the shield member body 101 is attached to the first attachment portion 871 with a tip end of the claw 102 facing the first end 811. Moreover, the claw 102 is in contact with the cylindrical case 2 while being slightly bent toward the cylindrical case 2 with respect to the shield member body 101. With this arrangement, the tip end of the claw 102 is electrically connected to the cylindrical case 2.

In the first physical quantity measuring device 1, the circuit substrate 7 is thus grounded to the cylindrical case 2 through the shield member 10. At this time, the shield member body 101 is attached to the first attachment portion 871 disposed close to the cover 5 with respect to the center of the holder 8. With this arrangement, since a distance between the shield member 10 and the signal transmitting member 11 provided to the cover 5 is shortened, an influence of noise entering through the signal transmitting member 11 can be more reliably reduced.

Second Physical Quantity Measuring Device

Next, a second physical quantity measuring device 1A in the exemplary embodiment will be described with reference to the drawings.

Figure 5:
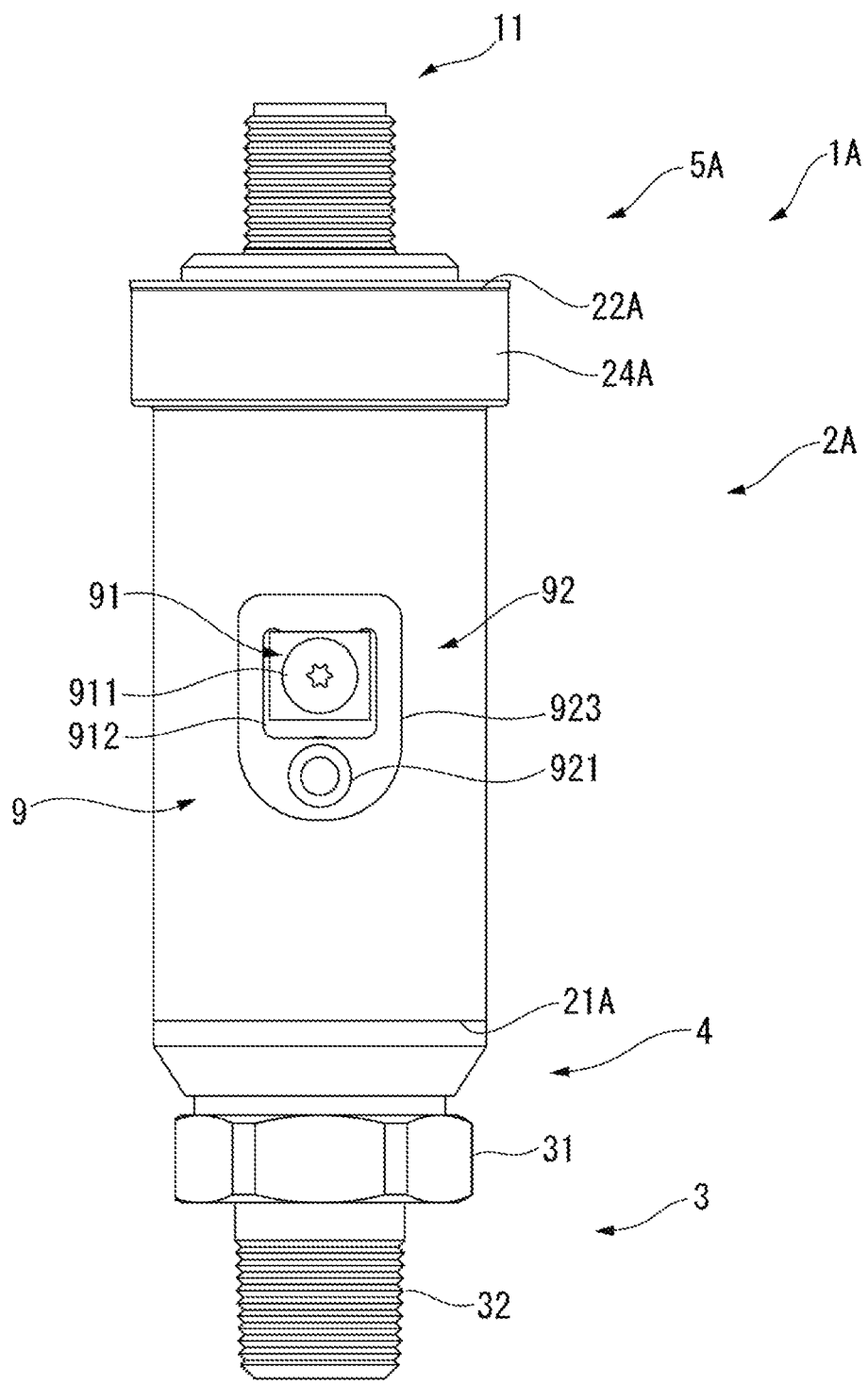
FIG. 5 is a front elevational view showing a second physical quantity measuring device according to the exemplary embodiment.
Figure 6:
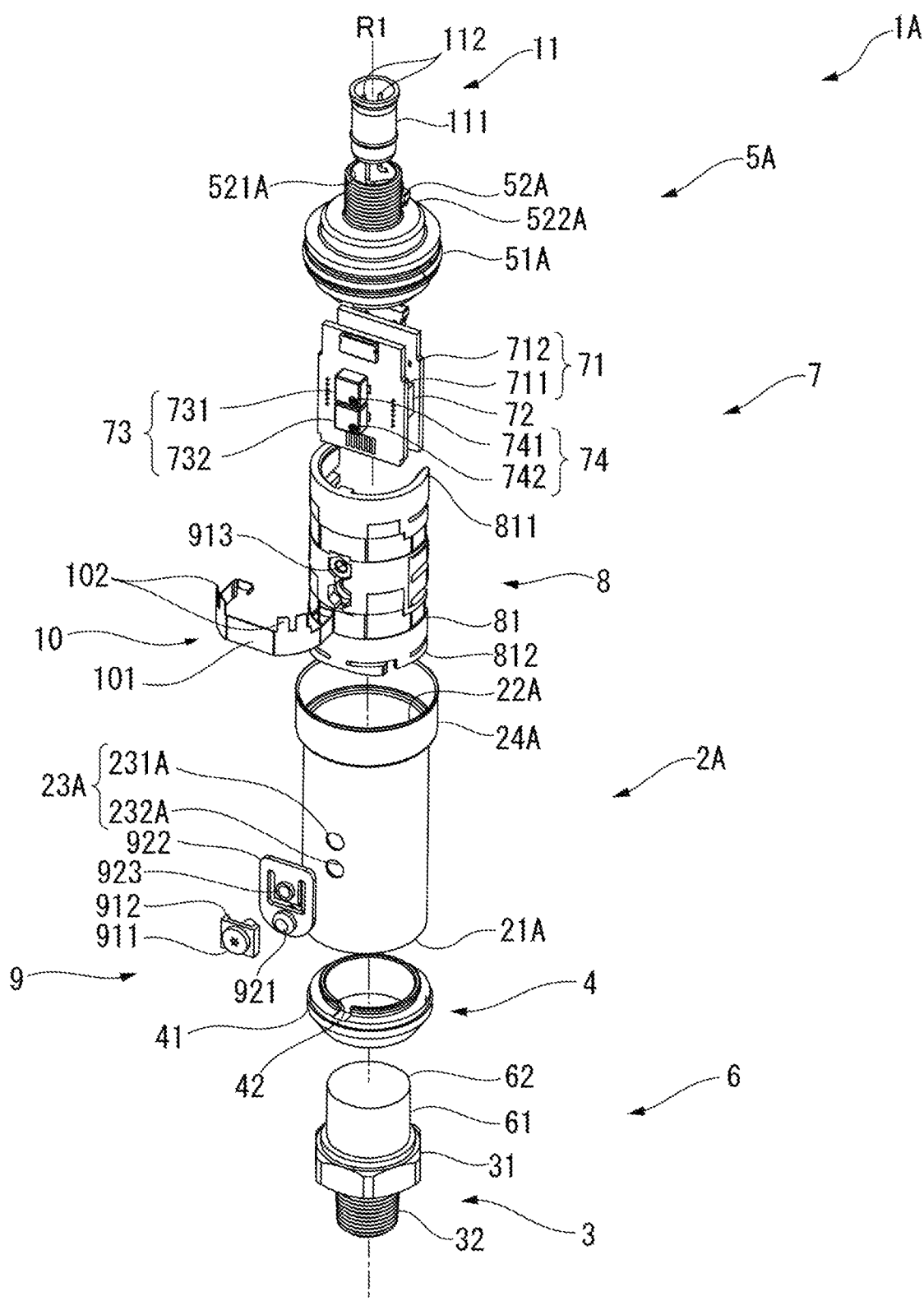
FIG. 6 is an exploded perspective view showing the second physical quantity measuring device according to the exemplary embodiment.

FIG. 5 shows a front elevational view of the second physical quantity measuring device 1A in the exemplary embodiment. FIG. 6 shows an exploded perspective view of the second physical quantity measuring device 1A. The second physical quantity measuring device 1A is different from the first physical quantity measuring device 1 in a cylindrical case 2A and a cover 5A. Moreover, the holder 8 is different from one in the first physical quantity measuring device 1 in the posture of the holder 8 to be housed in the cylindrical case 2A.

As shown in FIGS. 5 and 6, the second physical quantity measuring device 1A includes the cylindrical case 2A, the joint 3, the connector 4, the cover 5A, the sensor module 6, the circuit substrate 7, the holder 8, the cap member 9, the shield member 10, and the signal transmitting member 11.

It should be noted that the same components as those in the first physical quantity measuring device 1 will be denoted using the same signs in the description of the second physical quantity measuring device 1A to omit the explanation thereof. In other words, the joint 3, the connector 4, the sensor module 6, the circuit substrate 7, the holder 8, the cap member 9, the shield member 10 and the signal transmitting member 11 are common components with the first physical quantity measuring device 1 and the second physical quantity measuring device 1A. Accordingly, the description of the common components is partially omitted.

The cylindrical case 2A, which is a metallic member in a form of a cylinder similar to the cylindrical case 2, has a first open end 21A at a first end along a center axis R1 and a second open end 22A at a second end. Moreover, the cylindrical case 2A has operation holes 23A of a first operation hole 231A and a second operation hole 232A on the circumferential surface. Further, the cylindrical case 2A has a fitting ring 24A, in which the cover 5A is fitted, at the second open end 22A.

The cover 5A, which is a metallic member similar to the cover 5, includes a cover body 51A and a cylindrical portion 52A.

The cover body 51A in a form of a bottomed cylinder is attached to the cylindrical case 2A by crimping the fitting ring 24A. The cover body 51A will be described in detail later.

The cover body 51A has, on the bottom, a communication hole (not shown) in communication with the cylindrical portion 52A. An inner circumferential surface of the cylindrical portion 52A defines an attachment hole 521A in which the signal transmitting member 11 is housed. An outer circumferential surface of the cylindrical portion 52A defines a male thread 522A.

Holder

Figure 7:
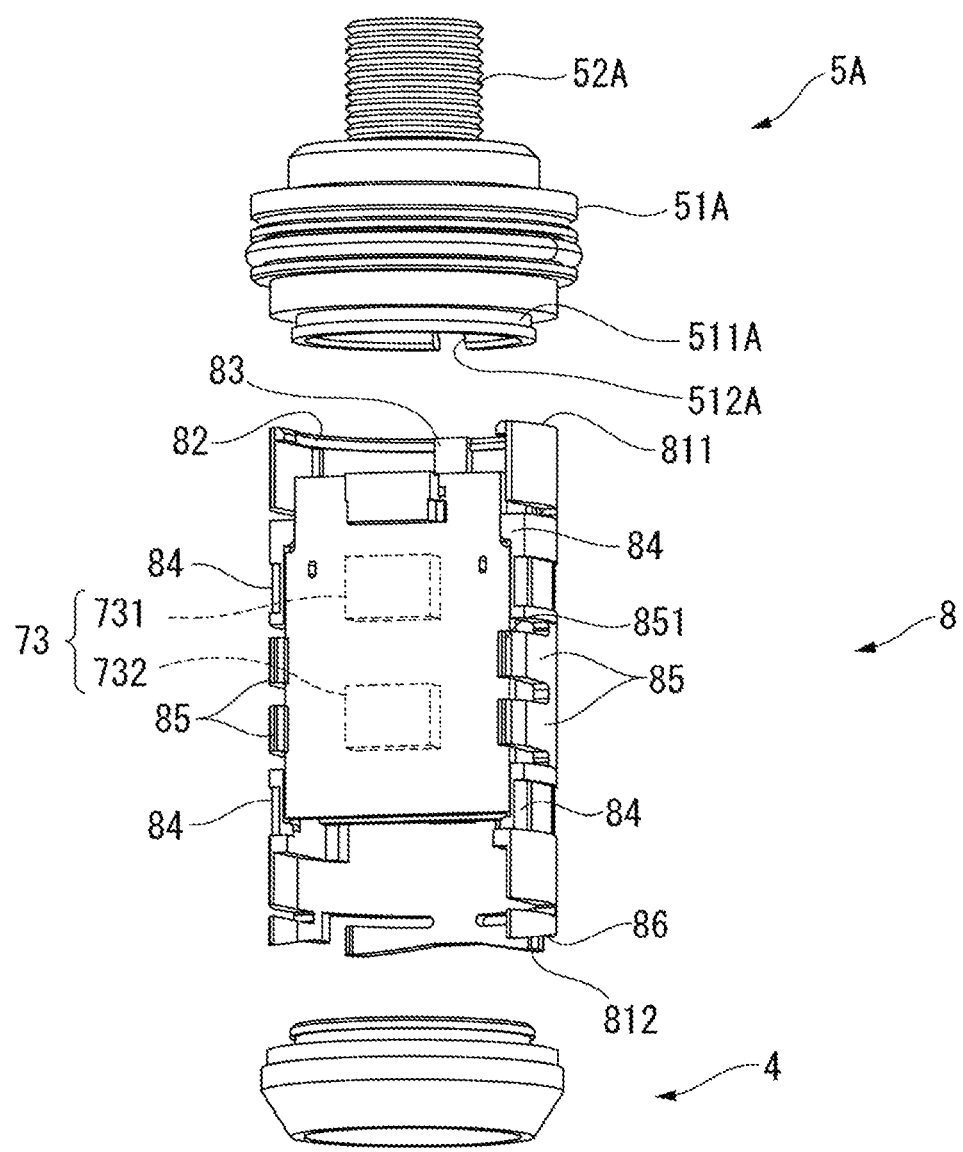
FIG. 7 is a perspective view showing a holder, a connector and a cover of the second physical quantity measuring device in the exemplary embodiment.

FIG. 7 is a perspective view showing the holder 8, the connector 4 and the cover 5A.

As described above, the holder 8 is a common component with the first physical quantity measuring device 1 and has the same arrangement as in the first physical quantity measuring device 1. However, in the second physical quantity measuring device 1A, the second end 812 is close to the connector 4 and the first end 811 is close to the cover 5A. In other words, the second physical quantity measuring device 1A is upside down with respect to the first physical quantity measuring device 1. This posture of the holder 8 is defined as a second posture. Accordingly, the holder 8 in the second posture can be housed in the cylindrical case 2A of the second physical quantity measuring device 1A.

The cover body 51A of the cover 5A has a second engagement groove 511A and a second positioning recess 512A being respectively engageable with the engaging projection 82 and the positioning projection 83 of the holder 8. Accordingly, in the second physical quantity measuring device 1A, the holder body 81 is attached to the cover 5A with the engaging projection 82 and the positioning projection 83 being respectively engaged with the second engagement groove 511A and the second positioning recess 512A. In this arrangement, the beam 86 is in contact with the connector 4.

The circuit substrate 7 is held by the holder 8 at the same position as in the first physical quantity measuring device 1. In other words, the holder 8 holds the circuit substrate 7 at the same position in the first posture and the second posture. Accordingly, a distance between the electronic circuit 72 and the sensor module 6 in the first physical quantity measuring device 1 is the same as that in the second physical quantity measuring device 1A. It should be noted that the same distance means not only exactly the same distance but also a distance including an error and the like caused during the manufacturing process.

Shield Member

Figure 8:
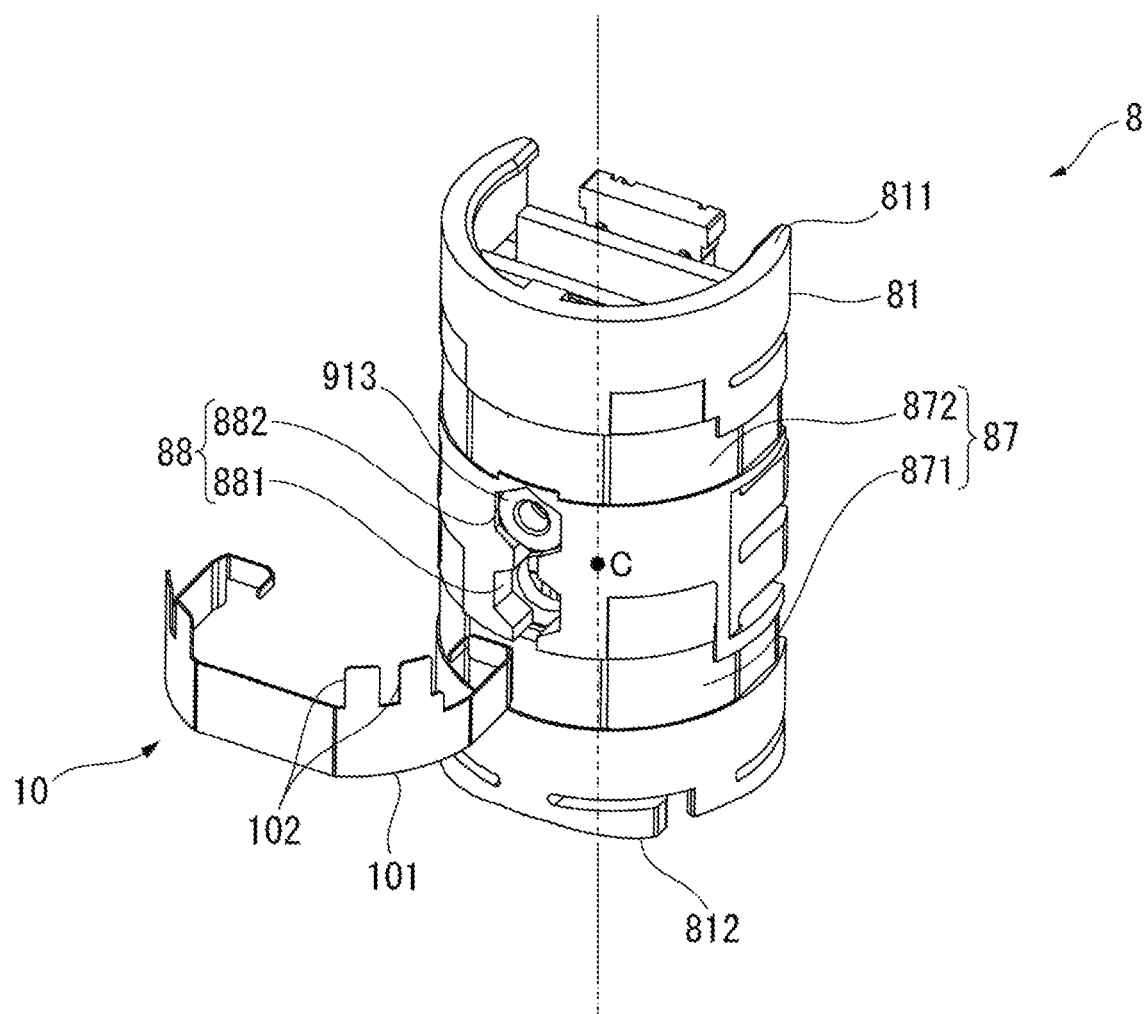
FIG. 8 is a perspective view showing the holder and a shield member viewed in a direction different from that in FIG. 7 in the exemplary embodiment.

FIG. 8 is a perspective view showing the holder 8 and the shield member 10 viewed in a direction different from that in FIG. 7.

In the second physical quantity measuring device 1A, the shield member body 101 of the shield member 10 is attached to the second attachment portion 872 as shown in FIG. 8. Accordingly, the shield member 10 in this arrangement is also disposed close to the cover 5A.

Moreover, the shield member body 101 is attached to the second attachment portion 872 with the tip end of the claw 102 facing the first end 811.

In the second physical quantity measuring device 1A, the nut 913 is attached to the second nut attachment portion 882.

Manufacturing Method of First Physical Quantity Measuring Device

Next, a manufacturing method of the first physical quantity measuring device 1 in the exemplary embodiment will be described.

Holding Step

Firstly, the circuit substrate 7 is held by the holder 8 as shown in FIG. 3. At this time, the circuit substrate 7 is held in the transversal direction between the hooks 85 while the circuit substrate 7 is held in the longitudinal direction between the engagement portions 84.

Moreover, as shown in FIG. 4, the shield member body 101 of the shield member 10 is attached to the first attachment portion 871 of the holder 8, and the nut 913 is attached to the first nut attachment portion 881.

Engaging Step

Figure 9:
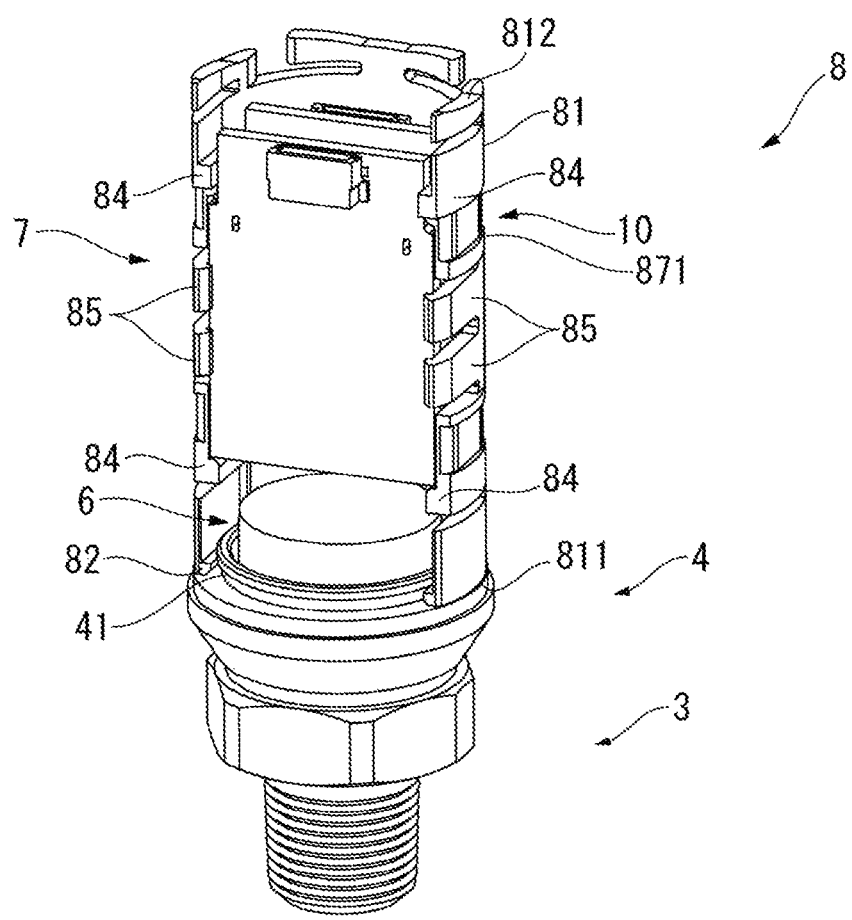
FIG. 9 is a perspective view showing the holder attached to the connector in a manufacturing process of the first physical quantity measuring device in the exemplary embodiment.

FIG. 9 is a view showing the holder 8 attached to the connector 4.

As shown in FIG. 9, the joint 3 attached with the sensor module 6 is connected to the connector 4 in advance. Subsequently, the engaging projection 82 of the holder 8 is engaged with the first engagement groove 41 of the connector 4, thereby attaching the holder 8 to the connector 4. By this operation, the holder 8 is disposed with the first end 811 being provided close to the connector 4. In other words, the holder 8 is in the first posture.

Moreover, at this time, the positioning projection 83 (see FIG. 3) of the holder 8 is engaged with the first positioning recess 42 (see FIG. 3) of the connector 4 to position the holder 8 relative to the connector 4, as described above.

In the manufacturing method of the first physical quantity measuring device 1 as described above, the holder 8 holding the circuit substrate 7 is engaged with the connector 4 connected to the joint 3 before the holder 8 is housed in the cylindrical case 2. This operation facilitates wiring of a power line or the like electrically connecting the circuit substrate 7 to the sensor module 6 attached to the joint 3.

It should be noted that the holding step of holding the circuit substrate 7 with the holder 8 and the connecting step of connecting the joint 3 to the connector 4 are not necessarily performed in a particular order, but may be performed in any order.

Housing Step

Figure 10:
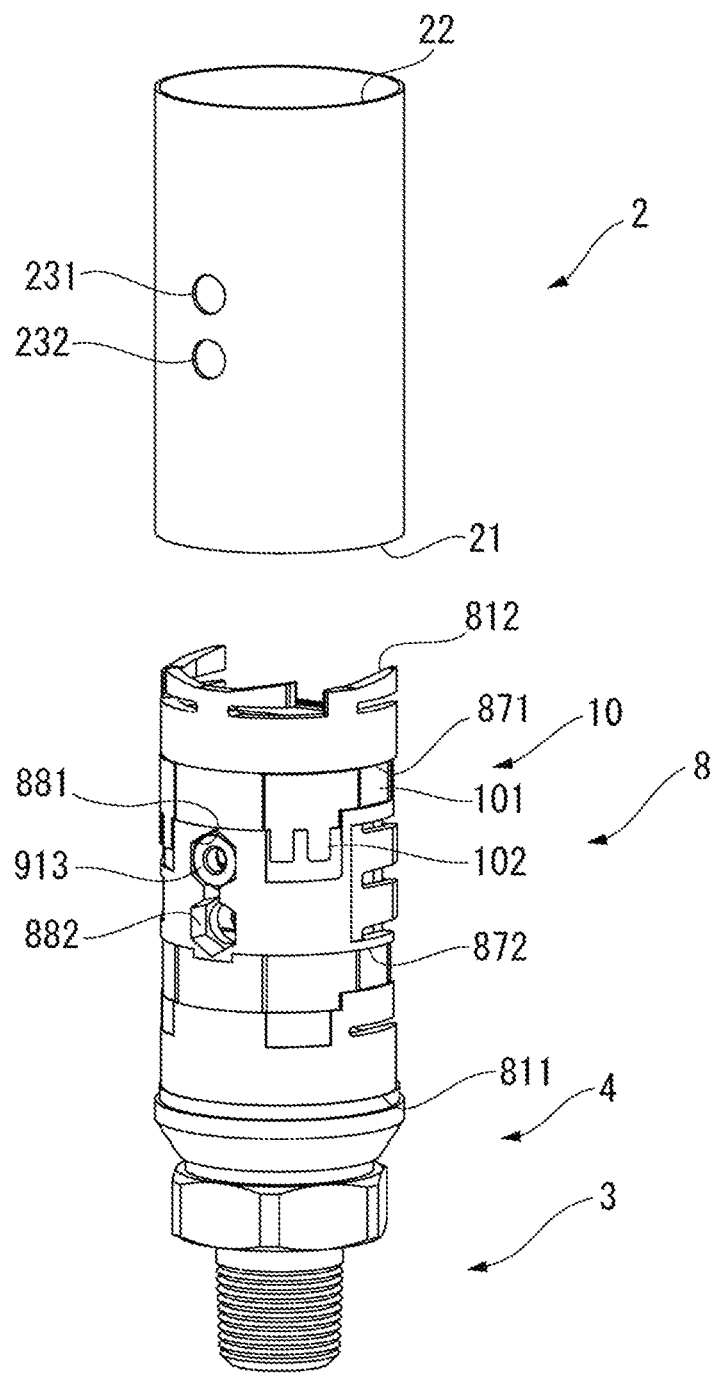
FIG. 10 is a perspective view showing the holder being housed in a cylindrical case in the manufacturing process of the first physical quantity measuring device in the exemplary embodiment.

FIG. 10 is a view showing the holder 8 that is being housed in the cylindrical case 2.

As shown in FIG. 10, the holder 8 attached to the connector 4 is housed from the first open end 21 into the cylindrical case 2.

At this time, the holder 8 in the first posture is housed into the cylindrical case 2 with the second end 812 ahead. Herein, as described above, the tip end of the claw 102 of the shield member 10 faces the first end 811, in other words, in an opposite direction from the direction in which the holder 8 is housed into the cylindrical case 2. Accordingly, when the holder 8 is housed into the cylindrical case 2, the tip end of the claw 102 is prevented from being caught with an inner surface of the cylindrical case 2.

First Welding Step

Figure 11:
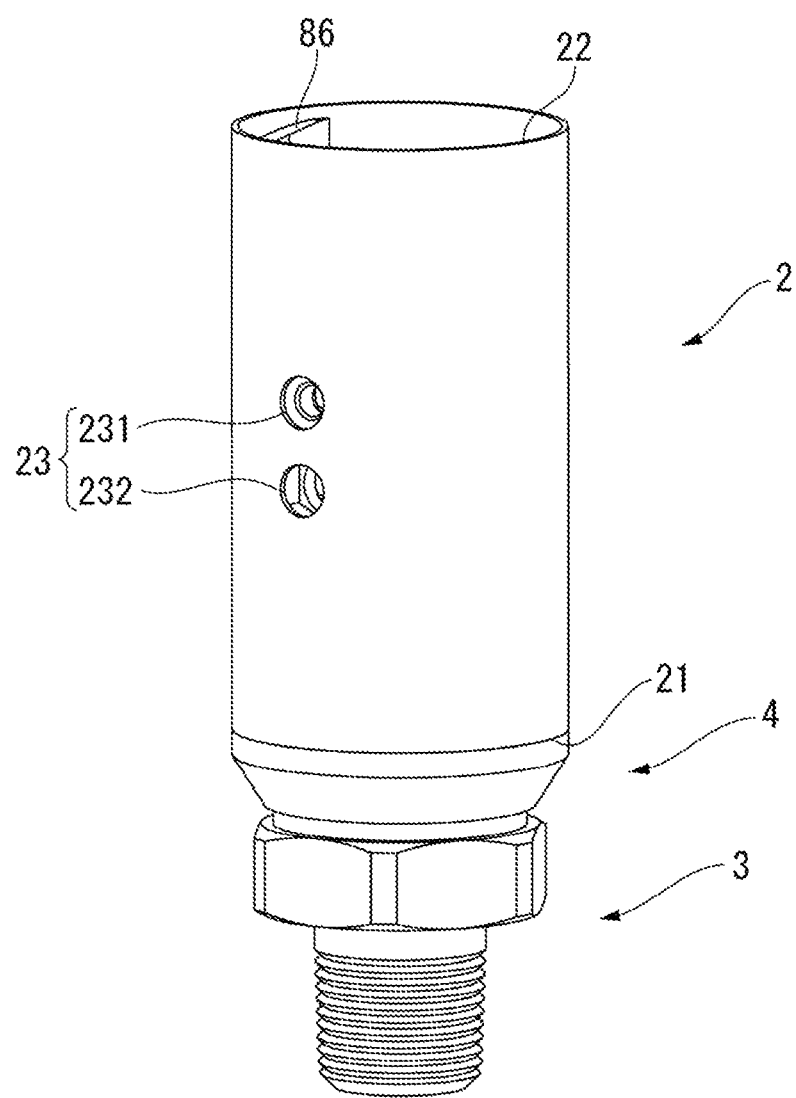
FIG. 11 is a perspective view showing the cylindrical case and the connector welded to each other in the manufacturing process of the first physical quantity measuring device in the exemplary embodiment.

FIG. 11 is a view showing the holder 2 welded to the connector 4.

As shown in FIG. 11, the connector 4 is welded to the first open end 21 of the cylindrical case 2. By this operation, the connector 4 is connected to the cylindrical case 2.

Second Welding Step

Figure 12:
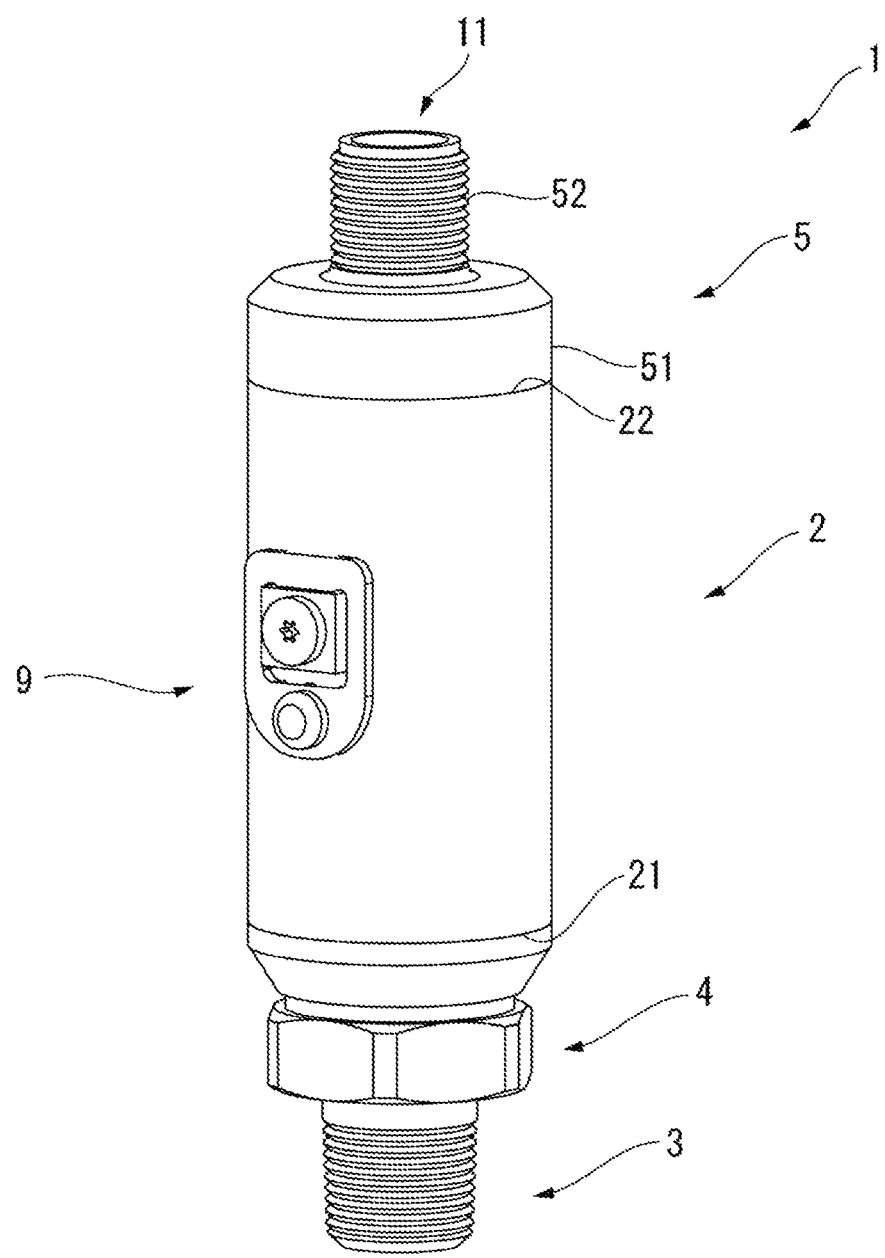
FIG. 12 is a perspective view showing the cylindrical case and the cover welded to each other in the manufacturing process of the first physical quantity measuring device in the exemplary embodiment.

FIG. 12 is a view showing the cover 5 welded to the cylindrical case 2.

As shown in FIG. 12, the cover body 51 of the cover 5 is welded to the second open end 22 of the cylindrical case 2. By this operation, the cover 5 is attached to the cylindrical case 2. At this time, the signal transmitting member 11 is attached in advance to the cylindrical portion 52 of the cover 5. Subsequently, before the cover 5 is welded to the cylindrical case 2, wiring of a power line or the like electrically connecting the circuit substrate 7 to the signal transmitting member 11 is made.

Finally, the cap member 9 is detachably attached over the operation hole 23 (see FIG. 2) of the cylindrical case 2. It should be noted that the cap member 9 may be attached before the cover 5 is welded to the cylindrical case 2.

Manufacturing Method of Second Physical Quantity Measuring Device

Next, a manufacturing method of the second physical quantity measuring device 1A in the exemplary embodiment will be described.

Welding Step

Figure 13:
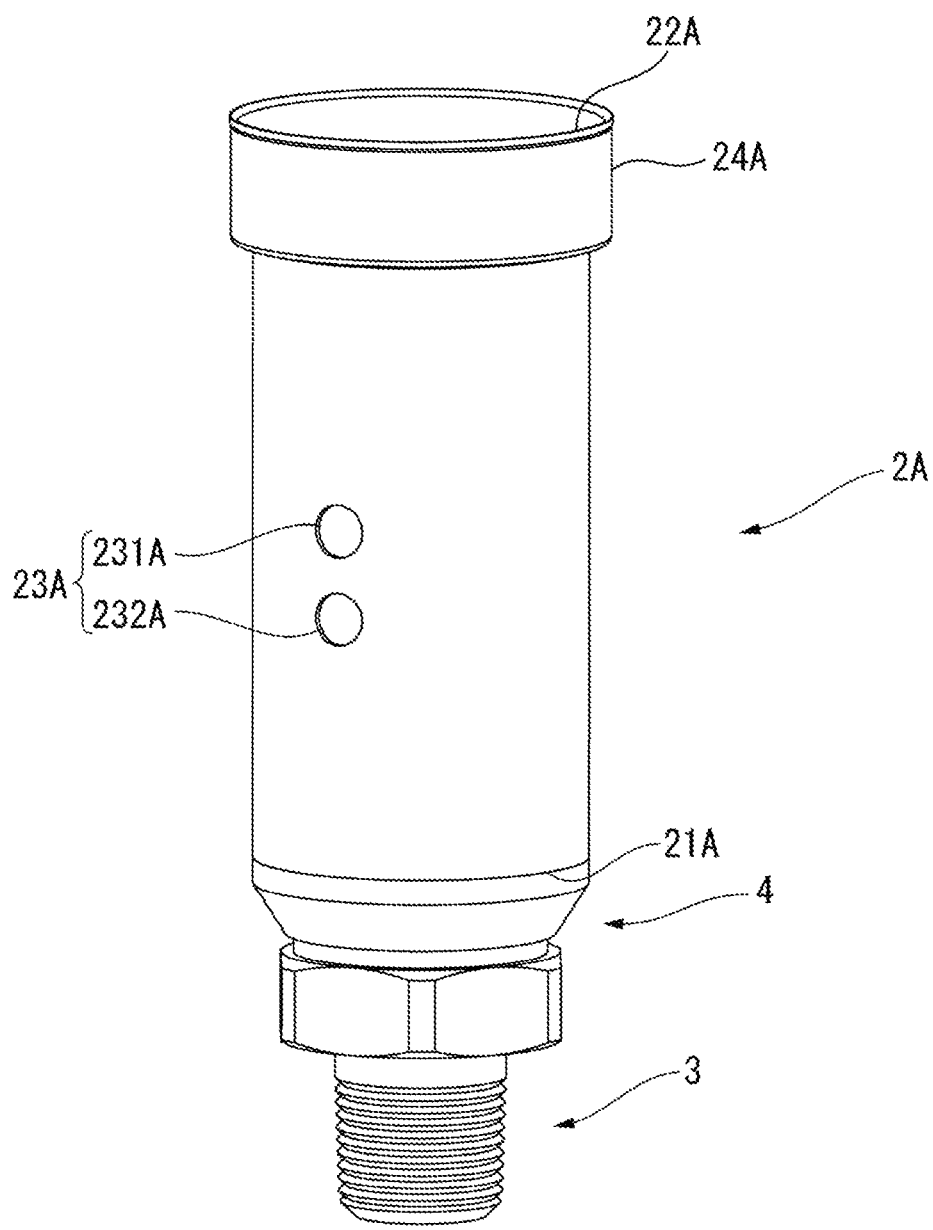
FIG. 13 is a perspective view showing a cylindrical case and the connector welded to each other in a manufacturing process of the second physical quantity measuring device in the exemplary embodiment.

FIG. 13 is a view showing the connector 4 welded to the cylindrical case 2A.

As shown in FIG. 13, the connector 4, which is connected in advance to the joint 3, is welded to the first open end 21A of the cylindrical case 2A. By this operation, the connector 4 is attached to the cylindrical case 2A.

Cleaning Step

Next, a welded portion between the cylindrical case 2A and the connector 4 is cleaned. In the exemplary embodiment, the welded portion is cleaned by ultrasonic cleaning.

This operation can remove welded spatters and the like adhering on the welded portion in the welding step. In the manufacturing method of the second physical quantity measuring device 1A, the welded portion can be thus cleaned before the circuit substrate 7 and the like are housed into the cylindrical case 2A. Accordingly, the welded portion can be cleaned without affecting the circuit substrate 7 and the like.

It should be noted that the welded portion is not necessarily cleaned by the ultrasonic cleaning, but may be cleaned, for instance, with chemicals and the like.

Holding Step

Next, the holder 8 holds the circuit substrate 7 as shown in FIG. 7. At this time, the holder 8 is turned upside down with respect to the holder 8 in the above-described first physical quantity measuring device 1 and holds the circuit substrate 7.

Moreover, as shown in FIG. 8, the shield member body 101 of the shield member 10 is attached to the second attachment portion 872 of the holder 8, and the nut 913 is attached to the second nut attachment portion 882.

Engaging Step

Figure 14:
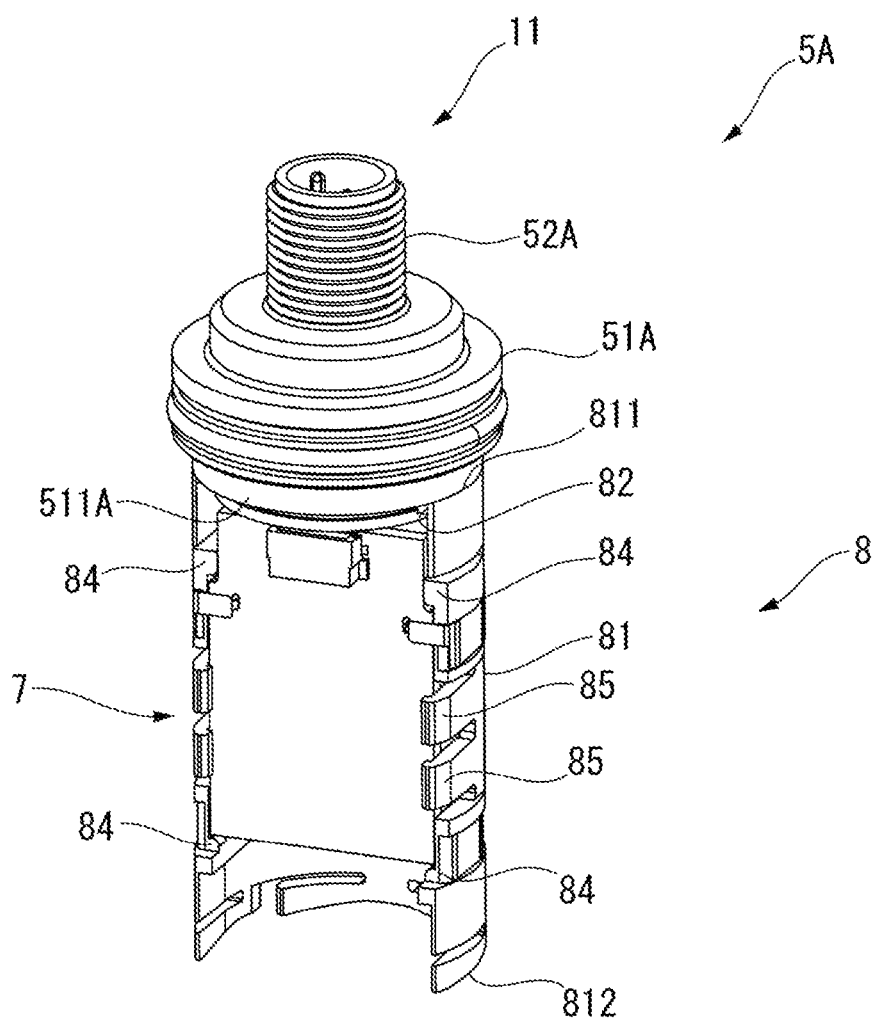
FIG. 14 is a perspective view showing the holder attached to the cover in the manufacturing process of the second physical quantity measuring device in the exemplary embodiment.

FIG. 14 is a view showing the holder 8 attached to the cover 5A.

As shown in FIG. 14, the signal transmitting member 11 is attached in advance to the cylindrical portion 52A of the cover 5A. Subsequently, the engaging projection 82 of the holder 8 is engaged with the second engagement groove 511A of the cover 5A, thereby attaching the holder 8 to the cover 5A. By this operation, the holder 8 is disposed with the first end 811 being provided close to the cover 5A. In other words, the holder 8 is in the second posture.

Moreover, at this time, the second positioning recess 512A (see FIG. 7) of the cover 5A is engaged with the positioning projection 83 (see FIG. 7) of the holder 8 to position the holder 8 relative to the cover 5A, as described above.

It should be noted that the signal transmitting member 11 is not necessarily attached to the cylindrical portion 52A in advance, but may be attached thereto after the holder 8 is attached to the cover 5A.

Housing Step

FIG. 15 is a view showing the holder 8 that is being housed in the cylindrical case 2A.

As shown in FIG. 15, the holder 8 attached to the cover 5A is housed from the second open end 22A into the cylindrical case 2A.

At this time, the holder 8 in the second posture is housed into the cylindrical case 2A with the second end 812 ahead. Herein, as described above, the tip end of the claw 102 of the shield member 10 faces the first end 811, in other words, in an opposite direction from the direction in which the holder 8 is housed into the cylindrical case 2A. Accordingly, when the holder 8 is housed into the cylindrical case 2A, the tip end of the claw 102 is prevented from being caught with an inner surface of the cylindrical case 2A.

Crimping Step

Figure 16:
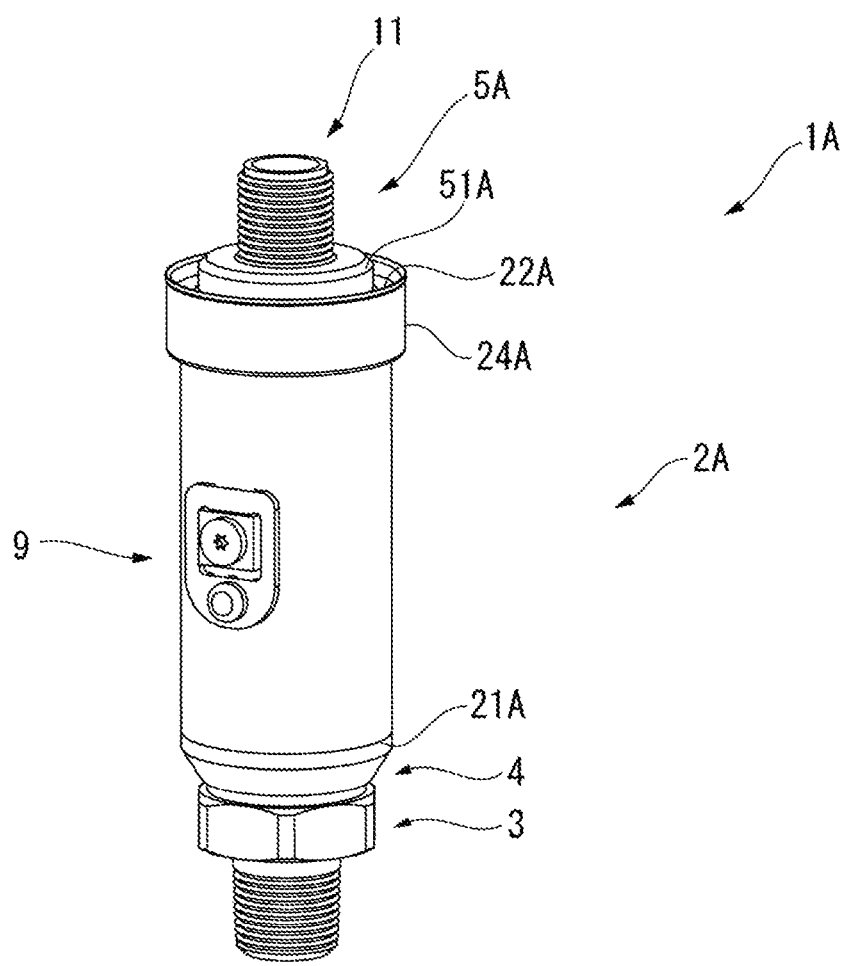
FIG. 16 is a perspective view showing the cover attached to the cylindrical case in the manufacturing process of the second physical quantity measuring device in the exemplary embodiment.

FIG. 16 is a view showing the cover 5A attached to the cover 2A.

As shown in FIG. 16, the cover body 51A of the cover 5A is attached to the second open end 22A of the cylindrical case 2A. At this time, the cover body 51A is attached to the cylindrical case 2A by crimping the fitting ring 24A. Accordingly, in the manufacturing method of the second physical quantity measuring device 1A, no welding is required for attachment of the cover 5A to the cylindrical case 2A.

Moreover, the signal transmitting member 11 is attached in advance to the cylindrical portion 52A of the cover 5A. Subsequently, before the cover 5A is attached to the cylindrical case 2A, wiring of a power line or the like electrically connecting the circuit substrate 7 to the signal transmitting member 11 is made.

Finally, the cap member 9 is detachably attached over the operation hole 23A (see FIG. 6) of the cylindrical case 2A. It should be noted that the cap member 9 may be attached before the cover 5A is attached to the cylindrical case 2A.

The following advantages can be obtained in the exemplary embodiment.

(1) In the exemplary embodiment, the holder 8 holding the circuit substrate 7 has the engaging projection 82 at the first end 811, the engaging projection 82 being engageable with the first engagement groove 41 of the connector 4 and the second engagement groove 511A of the cover 5A. With this arrangement, the holder 8 can be engaged with any one of the connector 4 and the cover 5A to be attached thereto. Accordingly, in the manufacturing process, the holder 8 is applicable to both of the first physical quantity measuring device 1 provided by welding the connector 4 to the cylindrical case 2 after attaching the holder 8 to the connector 4 and the second physical quantity measuring device 1A provided by attaching the cover 5A attached with the holder 8 to the cylindrical case 2A after welding the connector 4 to the cylindrical case 2A. Accordingly, the component serving as the support member can be used in common between the physical quantity measuring devices 1 and 1A provided by different manufacturing processes.

(2) In the exemplary embodiment, the holder 8, in any posture of the first posture and the second posture, holds the circuit substrate 7 at the same position. Accordingly, the distance between the electronic circuit 72 and the sensor module 6 in the first physical quantity measuring device 1 is the same as that in the second physical quantity measuring device 1A, so that a cable or the like electrically connecting the electronic circuit 72 and the sensor module 6 is usable in common between the first physical quantity measuring device 1 and the second physical quantity measuring device 1A.

(3) The operation hole 23 (23A) is provided on the circumferential surface of the cylindrical case 2 (2A) at the position corresponding to the operated portion 74 of the electronic adjuster 73. In this arrangement, a screwdriver or the like can be inserted from the operation hole 23 (23A) on the circumferential surface of the cylindrical case 2 (2A) to be used for operating the operated portion 74. By this operation, since it is not necessary to remove the cover 5 (5A) in order to operate the operated portion 74, the electronic circuit 72 can be easily adjusted. Moreover, since the cap member 9 is detachably attached over the operation hole 23 (23A), water can be prevented from entering the cylindrical case 2 (2A) through the operation hole 23 (23A).

(4) The operated portion 74 includes the first operated portion 741 for span adjustment and the second operated portion 742 for zero adjustment. The operation hole 23 (23A) has the first operation hole 231 (231A) at the position corresponding to the first operated portion 741 and the second operation hole 232 (232A) at the position corresponding to the second operated portion 742. With this arrangement, the first operated portion 741 or the second operated portion 742 is operable with a screwdriver or the like being inserted into the first operation hole 231 (231A) or the second operation hole 232 (232A), so that the span adjustment and the zero adjustment of the electronic circuit 72 can be easily conducted.

The second cap member 92 includes the second cap body 921 configured to close the second operation hole 232

(232A) and the second cap connector 922 extending from the second cap body 921 and having the insertion hole 923. The first cap member 91 includes the fastening portion 911 to be inserted into the insertion hole 923 and the first operation hole 231 (231A) and to fasten the second cap member 92 to the circumferential surface of the cylindrical case 2 (2A). Accordingly, the second cap body 921 can be prevented from being lost when the second cap body 921 is removed from the second operation hole 232 (232A).

Further, the first operation hole 231 (231A) provided at the position corresponding to the first operated portion 741 for the span adjustment is closed by the fastening portion 911 that is difficult to remove. Accordingly, in a daily maintenance and the like, the first operated portion 741 can be prevented from being unintentionally operated to conduct the span adjustment.

(5) Since the holder body 81 of the holder 8 includes the engagement portions 84 to restrict the movement of the circuit substrate 7 in the longitudinal direction and the hooks 85 to restrict the movement of the circuit substrate 7 in the transversal direction, the holder body 81 can securely hold the circuit substrate 7.

(6) The cover 5A is attached to the cylindrical case 2A by crimping the fitting ring 24A that is provided at the second open end 22A of the cylindrical case 2A. Accordingly, welding of the cover 5A to the cylindrical case 2A is not required. Consequently, cleaning of the welded portion is not required after the cover 5A is attached to the cylindrical case 2A, and the manufacturing process can be more freely designed.

(7) The beam 86 elastically deformable in the direction along the center axis R (R1) of the cylindrical case 2 (2A) is provided at a part of the second end 812 of the holder 8, where the beam 86 can contact with the connector 4 and the cover 5 (5A). Accordingly, when the holder 8 in any posture of the first posture and the second posture is housed in the cylindrical case 2 (2A), the holder 8 can be reliably brought into contact with the connector 4 or the cover 5 (5A). Consequently, the holder 8 being housed in the cylindrical case 2 (2A) can be prevented from moving in the direction along the center axis R (R1) of the cylindrical case 2 (2A).

(8) The shield member 10 configured to electrically connect the circuit substrate 7 to the cylindrical case 2 (2A) is provided. With this arrangement, since the circuit substrate 7 is grounded to the cylindrical case 2 (2A), noise entering through the signal transmitting member 11 can be prevented from affecting the electronic circuit 72.

Moreover, the shield member 10 is attached to a part of the holder 8 close to the cover 5 (5A) with respect to the center C of the holder 8 in the longitudinal direction, irrespective of the first posture or the second posture of the holder 8 to be housed in the cylindrical case 2 (2A). With this arrangement, since the distance between the shield member 10 and the signal transmitting member 11 can be shortened, the influence of noise entering the circuit substrate through the signal transmitting member 11 can be reliably reduced.

(9) The shield member body 101 is attached to the first attachment portion 871 or the second attachment portion 872 with the tip end of the claw 102 facing the first end 811.

Accordingly, irrespective of the first posture or the second posture of the holder 8 to be housed in the cylindrical case 2 (2A), the claw 102 of the shield member 10 can be prevented from being caught with the inner surface of the cylindrical case 2 (2A) to be damaged.

(10) In the manufacturing method of the first physical quantity measuring device 1, the holder 8 holding the circuit substrate 7 is engaged with the connector 4 connected to the joint 3 before the holder 8 is housed in the cylindrical case 2. This operation facilitates wiring of a power line or the like electrically connecting the circuit substrate 7 to the sensor module 6 attached to the joint 3.

(11) In the manufacturing method of the second physical quantity measuring device 1A, the holder 8 holding the circuit substrate 7 is housed in the cylindrical case 2A after the welded portion of the cylindrical case 2A to the connector 4 is cleaned. Accordingly, the welded portion can be cleaned without affecting the circuit substrate 7.

It should be understood that the scope of the invention is not limited to the above-described exemplary embodiment but includes modifications and improvements as long as the modifications and improvements are compatible with an object of the invention.

In the above exemplary embodiment, the holder 8 is used in common between the two types of the physical quantity measuring devices (i.e., the first physical quantity measuring device 1 and the second physical quantity measuring device 1A). However, the common holder 8 is not limited to usage for two types of the physical quantity measuring devices. For instance, in some embodiments, the holder 8 is used in common between three types of the physical quantity measuring devices including a third physical quantity measuring device 1B in addition to the above the two types of the physical quantity measuring devices. The invention encompasses a case where the holder 8 is used in common among a plurality of physical quantity measuring devices whose manufacturing processes are different.

In the above exemplary embodiment, the joint 3, the connector 4, the sensor module 6, the circuit substrate 7, the cap member 9, the shield member 10 and the signal transmitting member 11 are common components between the first physical quantity measuring device 1 and the second physical quantity measuring device 1A. However, the above components are not necessarily used in common. For instance, in some embodiments, the signal transmitting member 11 is different between the first physical quantity measuring device 1 and the second physical quantity measuring device 1A. Any physical quantity measuring devices having the holder 8 in common are encompassed in the invention.

In the above exemplary embodiment, two electronic adjusters 73 respectively for the span adjustment and the zero adjustment are provided. However, the usage of the electronic adjusters 73 is not limited to the above. For instance, in some embodiments, the two electronic adjusters 73 are respectively used for a linear adjustment and a dampener.

Further, the number of the electronic adjuster 73 is not limited to two. A single electronic adjuster 73 may be used, or three or more electronic adjusters 73 may be used. Furthermore, the invention encompasses a physical quantity measuring device without including the electronic adjuster. In this case, the operation hole and eventually the cap member are not necessarily provided to the cylindrical case.

In the above exemplary embodiment, the operation hole 23 (23A) is provided to the circumferential surface of the cylindrical case 2 (2A). However, the location of the operation hole is not limited to the above. For instance, in some embodiments, the operation hole is provided to the cover.

In the above exemplary embodiment, the holder 8, irrespective of the first posture or the second posture, holds the circuit substrate 7 at the same position. However, the position of holding the circuit substrate 7 is not limited to the above. In some embodiments, the holder 8 holds the circuit substrate 7 at different positions. In this case, the distance between the electronic circuit and the sensor module with the holder 8 in the first posture may be different from the distance therebetween with the holder 8 in the second posture.

In the above exemplary embodiment, the fastening portion 911 of the first cap member 91 is inserted in the insertion hole 923 provided to the second cap connector 922 of the second cap member 92. However, the arrangement of the second cap member 92 is not limited to the above. For instance, in some embodiments, the second cap member further includes an attachment portion attached to the second cap connector, and another insertion hole into which the fastening portion is inserted is provided to the attachment portion. In this case, the second cap body is fastened to the circumference of the cylindrical case through the second cap connector, the attachment portion, and the fastening portion.

Moreover, in some embodiments, the attachment portion has a communication hole at a position corresponding to the second operation hole. In this case, the second cap body passes through the communication hole and closes the second operation hole.

In the exemplary embodiment, the cap member 9 includes the metallic first cap member 91 and the rubber second cap member 92. However, the structure of the cap member is not limited to the above. For instance, in some embodiments, the first cap member and the second cap member are integrally formed of a rubber member. In other words, the cap member includes a first cap body, the second cap body, and a connector. The connector connects the first cap body to the second cap body. The first cap body and the second cap body may project from the connector. In this case, the first cap member does not necessarily have the fastening portion, the washer, and the nut.

In the above exemplary embodiment, the circuit substrate 7 is grounded to the cylindrical case 2 (2A) through the shield member 10. However, the grounding of the circuit substrate is not limited to the above. For instance, in some embodiment, the circuit substrate is grounded to the cover.

Moreover, although the shield member 10 includes the shield member body 101 and the claw 102, the structure of the shield member is not limited thereto. For instance, in some embodiments, the shield member includes the shield member body and a projection projecting from the shield member body toward the cylindrical case or the cover to be in contact with the cylindrical case or the cover. It is only necessary that the circuit substrate can be grounded to the cylindrical case or the cover through the shield member.

Furthermore, the invention encompasses a physical quantity measuring device without including the shield member.

In the above exemplary embodiment, the first physical quantity measuring device 1 and the second physical quantity measuring device 1A can measure the pressure of the measurement target fluid. However, not only the pressure but also a differential pressure, a temperature and the like can be measured.

What is claimed is:

1. A physical quantity measuring device comprising:
    a sensor module configured to detect a physical amount;
    a joint attached with the sensor module;
    an annular connector configured to be connected to a first open end of a first cylindrical case and the joint, and also to be connected to a first open end of a second cylindrical case and the joint;
    a circuit substrate attached with an electronic circuit configured to receive a signal detected by the sensor module;
    a holder holding the circuit substrate,
    wherein the holder comprising a first end and a second end is configured to be housed in the first cylindrical case in a first posture, the first end being engaged with the connector and the second end being in contact with a first cover placed to a second open end of the first cylindrical case when the holder is in the first posture, and the holder comprises, at the first end, an engaging projection engaged with a first engagement groove provided to the connector when the holder is in the first posture, and
    wherein the holder comprising the first end and the second end is configured to be housed in the second cylindrical case in a second posture, the second end being in contact with the connector and the first end being engaged with a second cover placed to a second open end of the second cylindrical case when the holder is in the second posture, and the holder comprises, at the first end, the engaging projection engaged with a second engagement groove provided to the second cover when the holder is in the second posture.

2. The physical quantity measuring device according to claim 1, wherein
    a distance between the electronic circuit and the sensor module when the holder is in the first posture is the same as the distance when the holder is in the second posture.

3. The physical quantity measuring device according to claim 1, wherein
    the circuit substrate comprises an electronic adjuster configured to adjust the electronic circuit,
    the electronic adjuster comprises at least one operated portion that is disposed facing a circumferential surface of the cylindrical cases,
    each of the cylindrical cases comprises at least one operation hole at a position corresponding to the at least one operated portion on the circumferential surface, and
    the physical quantity measuring device further comprises at least one cap member detachably attached over the at least one operation hole.

4. The physical quantity measuring device according to claim 3, wherein
    the at least one operated portion comprises a first operated portion for span adjustment and a second operated portion for zero adjustment,
    the at least one operation hole comprises a first operation hole provided at a position corresponding to the first operated portion and a second operation hole provided at a position corresponding to the second operated portion,
    the at least one cap member comprises a first cap member configured to close the first operation hole and a second cap member configured to close the second operation hole,
    the second cap member comprises a second cap body configured to close the second operation hole and a second cap connector extending from the second cap body and comprising an insertion hole, and
    the first cap member comprises a fastening portion configured to be inserted in the insertion hole and the first operation hole and to fasten the second cap member to the circumferential surface of the cylindrical cases.

5. The physical quantity measuring device according to claim 1, wherein
the circuit substrate is rectangular in a plan view and a longitudinal direction of the circuit substrate is directed along center axes of the cylindrical cases,
the holder comprises a substantially cylindrical holder body comprising a cutout formed at a part of a circumference of the cylindrical holder body and extending in the longitudinal direction, and
the holder body comprises: an engagement portion configured to restrict a movement of the circuit substrate in the longitudinal direction; and a hook configured to restrict a movement of the circuit substrate in a direction intersecting the longitudinal direction.

6. The physical quantity measuring device according to claim 1, wherein the second cover is attached to the second cylindrical case by crimping the second open end of the second cylindrical case.

7. The physical quantity measuring device according to claim 1, wherein
the holder comprises a beam elastically deformable in a direction along center axes of the cylindrical cases and provided at a part of the second end of the holder, where the beam is capable of contacting with the connector and the covers.

8. The physical quantity measuring device according to claim 1, further comprising:
a signal transmitting member provided to the covers and configured to be electrically connected to the circuit substrate, and
a shield member configured to electrically connect the circuit substrate to the cylindrical cases, wherein
the holder comprises a shield-member attachment portion to which the shield member is attachable,
the shield-member attachment portion comprises: a first attachment portion close to the second end with respect to a center of the holder; and a second attachment portion close to the first end with respect to the center of the holder, and
the shield member is attached to the first attachment portion when the holder in the first posture is housed in the first cylindrical case, and the shield member is attached to the second attachment portion when the holder in the second posture is housed in the second cylindrical case.

9. The physical quantity measuring device according to claim 8, wherein
the shield member comprises: a shield member body that is attached to the first attachment portion or the second attachment portion and is configured to be electrically connected to the circuit substrate; and a claw extending from the shield member body, a tip end of the claw being configured to be electrically connected to the cylindrical cases, and
the shield member body is attached to the first attachment portion or the second attachment portion with the tip end of the claw facing the first end of the holder.

10. A manufacturing method of the physical quantity measuring device according to claim 1, the method comprising:
holding the circuit substrate with the holder;
engaging the engaging projection of the holder with the first engagement groove of the connector connected to the joint;
housing the holder in the first posture into the first cylindrical case from the first open end of the first cylindrical case;
firstly welding the connector to the first open end of the first cylindrical case; and
secondly welding the first cover to the second open end of the first cylindrical case.

11. A manufacturing method of the physical quantity measuring device according to claim 1, the method comprising:
welding the connector connected to the joint to the first open end of the second cylindrical case;
cleaning a welded portion between the second cylindrical case and the connector;
holding the circuit substrate with the holder;
engaging the engaging projection of the holder with the second engagement groove of the second cover;
housing the holder in the second posture into the second cylindrical case from the second open end of the second cylindrical case and bringing the second end of the holder into contact with the connector; and
crimping the second open end of the second cylindrical case to attach the second cover to the second cylindrical case.

* * * * *